United States Patent
Kang et al.

(10) Patent No.: US 10,616,474 B2
(45) Date of Patent: Apr. 7, 2020

(54) ELECTRONIC DEVICE INCLUDING IRIS RECOGNITION SENSOR AND METHOD OF OPERATING THE SAME

(71) Applicant: Samsung Electronics Co., Ltd., Gyeonggi-do (KR)

(72) Inventors: Seung Goo Kang, Seongnam-si (KR); Jin Hwan Seo, Suwon-si (KR); Dong Il Son, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/684,793

(22) Filed: Aug. 23, 2017

(65) Prior Publication Data

US 2018/0063420 A1 Mar. 1, 2018

(30) Foreign Application Priority Data

Aug. 23, 2016 (KR) .......................... 10-2016-0107013

(51) Int. Cl.
*H04N 5/232* (2006.01)
*H04N 9/04* (2006.01)
(Continued)

(52) U.S. Cl.
CPC ..... *H04N 5/23219* (2013.01); *G06K 9/00604* (2013.01); *H04N 5/2253* (2013.01);
(Continued)

(58) Field of Classification Search
None
See application file for complete search history.

(56) References Cited

U.S. PATENT DOCUMENTS 7,095,901 B2   8/2006   Lee et al.
8,212,870 B2   7/2012   Hanna et al.
(Continued)

FOREIGN PATENT DOCUMENTS

EP   1241614 A2    9/2002
KR   200355279 Y1  7/2004
(Continued)

OTHER PUBLICATIONS

International Search Report and Written Opinion for International Application No. PCT/KR2017/008628, dated Nov. 17, 2017. (12 pages).

(Continued)

*Primary Examiner* — Lindsay J Uhl

(57) ABSTRACT

An electronic device comprising a housing, a display, a light emitting module, a camera, and a processor electrically connected with the light emitting module and the camera. The housing includes a first surface that is open in a first direction and a second surface that is disposed in a second direction. The display including a window disposed on the first surface that is open. The light emitting module is disposed under the window to radiate light related to an iris sensing function. The camera is disposed under the window and spaced apart from the light emitting module by a specific distance. The processor selectively performs at least one of the iris sensing function, a proximity sensing function or a super proximity sensing function based on the camera according to a type of an application under execution.

17 Claims, 12 Drawing Sheets

(51) Int. Cl.
    *G06K 9/00*      (2006.01)
    *H04N 5/225*     (2006.01)
    *H04N 5/235*     (2006.01)
    *H04N 5/33*      (2006.01)
    *H04N 5/345*     (2011.01)
    *H04W 52/02*     (2009.01)

(52) U.S. Cl.
    CPC ......... *H04N 5/2254* (2013.01); *H04N 5/2256* (2013.01); *H04N 5/2354* (2013.01); *H04N 5/23218* (2018.08); *H04N 5/23241* (2013.01); *H04N 5/23293* (2013.01); *H04N 5/332* (2013.01); *H04N 5/345* (2013.01); *H04N 9/045* (2013.01); *H04W 52/0254* (2013.01)

(56) References Cited

U.S. PATENT DOCUMENTS

| | | | |
|---|---|---|---|
| 8,553,948 B2 | 10/2013 | Hanna | |
| 8,958,606 B2 | 2/2015 | Hanna et al. | |
| 9,002,073 B2 | 4/2015 | Hanna et al. | |
| 9,036,871 B2 | 5/2015 | Hanna et al. | |
| 9,055,198 B2 | 6/2015 | Hanna et al. | |
| 9,095,287 B2 | 8/2015 | Hanna | |
| 9,117,119 B2 | 8/2015 | Hanna et al. | |
| 9,192,297 B2 | 11/2015 | Hanna | |
| 9,280,706 B2 | 3/2016 | Hanna | |
| 9,329,680 B2 | 5/2016 | Yoon | |
| 9,626,563 B2 | 4/2017 | Hanna et al. | |
| 9,633,260 B2 | 4/2017 | Hanna | |
| 2002/0131622 A1 | 9/2002 | Lee et al. | |
| 2009/0219387 A1* | 9/2009 | Marman | G08B 13/19652 348/143 |
| 2010/0232655 A1 | 9/2010 | Hanna | |
| 2011/0211054 A1 | 9/2011 | Hanna et al. | |
| 2012/0172085 A1 | 7/2012 | Vuppu et al. | |
| 2012/0212597 A1 | 8/2012 | Hanna | |
| 2012/0242820 A1 | 9/2012 | Hanna et al. | |
| 2012/0242821 A1 | 9/2012 | Hanna et al. | |
| 2012/0243749 A1 | 9/2012 | Hanna et al. | |
| 2013/0162798 A1 | 6/2013 | Hanna et al. | |
| 2013/0162799 A1 | 6/2013 | Hanna et al. | |
| 2013/0182093 A1 | 7/2013 | Hanna | |
| 2013/0182094 A1 | 7/2013 | Hanna | |
| 2013/0182095 A1 | 7/2013 | Hanna | |
| 2013/0293457 A1* | 11/2013 | Yoon | G06F 3/013 345/156 |
| 2014/0166867 A1 | 6/2014 | Shiu et al. | |
| 2015/0042789 A1 | 2/2015 | Inwood et al. | |
| 2015/0235070 A1* | 8/2015 | Wang | G06K 9/00006 382/115 |
| 2016/0048731 A1 | 2/2016 | Hanna et al. | |
| 2016/0119522 A1 | 4/2016 | Choi et al. | |
| 2016/0148051 A1 | 5/2016 | Hanna | |
| 2016/0191827 A1 | 6/2016 | Hanna | |
| 2016/0282934 A1* | 9/2016 | Willis | H04L 9/3231 |
| 2017/0192499 A1* | 7/2017 | Trail | G06F 3/013 |

FOREIGN PATENT DOCUMENTS

| | | | |
|---|---|---|---|
| KR | 20130024814 A | 3/2013 | |
| KR | 20130123859 A | 11/2013 | |
| KR | 20130135983 A | 12/2013 | |
| WO | WO-2017183795 A1 * | 10/2017 | ............... G01J 1/02 |

OTHER PUBLICATIONS

Supplementary European Search Report dated Jul. 10, 2019 in connection with European Patent Application No. 1784 3849, 9 pages.

* cited by examiner

ELECTRONIC DEVICE INCLUDING IRIS RECOGNITION SENSOR AND METHOD OF OPERATING THE SAME

CROSS-REFERENCE TO RELATED APPLICATION AND CLAIM OF PRIORITY

This application is related to and claims priority to Korean Patent Application No. 10-2016-0107013 filed on Aug. 23, 2016, the contents of which are incorporated herein by reference.

TECHNICAL FIELD

Various embodiments relate to iris recognition sensors.

BACKGROUND

Recently, an electronic device may store various pieces of user information. For example, the electronic device may store photos or documents. In addition, the electronic device may store financial information requiring security.

Since the electronic device has personal information and financial information as described above, there has been required a technical device related to security.

SUMMARY

To address the above-discussed deficiencies, it is a primary object to provide at least the advantages described below. Various embodiments provide electronic devices including iris recognition sensors capable of protecting information stored in the electronic devices while readily processing specified functions of the electronic devices, and methods of operating the same.

In accordance with an aspect of the present disclosure, an electronic device is provided. The electronic device may include a housing including a first surface that is open in a first direction and a second surface that is disposed in a second direction, a display including a window disposed on the first surface that is open, a light emitting module disposed under the window to radiate light related to a iris sensing function, a camera disposed under the window and spaced apart from the light emitting module by a specific distance and a processor electrically connected with the light emitting module and the camera, wherein the processor is configured to selectively perform at least one of the iris sensing function, a proximity sensing function or a super proximity sensing function based on the camera according to a type of an application which is requested to be executed.

In accordance with an aspect of the present disclosure, another electronic device is provided. The electronic device may include a housing including a first surface that is open in a first direction and a second surface that is disposed in a second direction, a display including a window disposed on the first surface that is open, a light emitting module disposed under the window to radiate light related to iris sensing, a camera disposed under the window and spaced apart from the light emitting module by a specific distance, a proximity sensor disposed under the window and a processor electrically connected with the proximity sensor, the light emitting module, and the camera, wherein the processor is configured to perform a control operation to perform an iris sensing function and a super proximity sensing function based on the camera or to perform a proximity sensing function based on the proximity sensor, according to a type of an application which is requested to be executed.

In accordance with an aspect of the present disclosure, a method of operating an electronic device is provided. The method may include receiving a request for execution of a call function application based on a communication interface, activating a camera corresponding to the request for the execution of the call function application, performing proximity sensing by using the camera, activating a proximity sensor if an object has proximity within a specified first distance and performing the proximity sensing by using the proximity sensor.

In accordance with an aspect of the present disclosure, another method of operating an electronic device is provided. The method may include receiving a request for execution of an application, activating an illuminance sensor corresponding to the request for the execution of the application, measuring illuminance by using an iris camera having an infrared pass filter disposed on an image sensor of the iris camera, if an illuminance value measured by the illuminance sensor is less than a first illuminance value and acquiring an image by turning on entire pixels of the image sensor when the image is captured by using the iris camera, if an illuminance value sensed based on the iris camera is less than a specified value.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
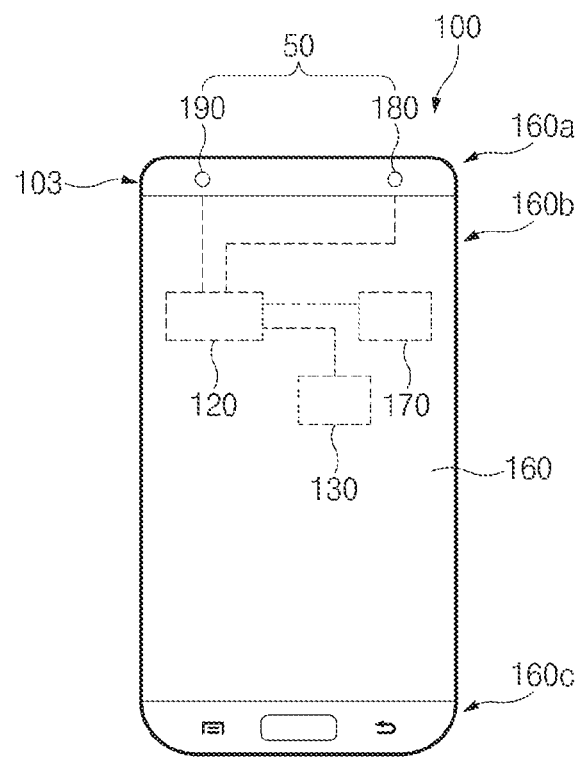
FIG. 1 is a view illustrating one example of an electronic device including an iris recognition sensor, according to an embodiment of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic accessories, electronic tattoos, smart watches, and the like.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync®, Apple TV®, or Google TV®), game consoles (e.g., Xbox® or PlayStation®), electronic dictionaries, electronic keys, camcorders, electronic picture frames, or the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 is a view illustrating one example of an electronic device including an iris recognition sensor, according to an embodiment of the present disclosure.

Referring to FIG. 1, an electronic device 100 may be provided in an overall rectangular shape and at least a portion of a corner of the electronic device 100 may be rounded. According to various embodiments, at least one (e.g., a left side portion or a right side portion of a display 160 that is longitudinally arranged in a lengthwise direction) of side portions of the electronic device 100 may be gradually curved toward an edge of the electronic device 100 such that the electronic device 100 is provided in an edge type.

In the electronic device 100, the display 160 may be provided inside a housing 103, and a processor 120, a memory 130, a communication interface 170, and the like may be provided inside the housing 103 and under the display 160. In addition, according to various embodiments, the electronic device 100 may further include an iris camera, a camera which captures an image, and an illuminance sensor which provides turn-on conditions for at least some pixels included in the iris camera. The illuminance sensor may include, for example, an RGB sensor.

The display 160 may include a window, and the electronic device 100 may include iris recognition sensors 50 disposed in at least one side area (e.g., an upper-end non-display area 160a) under the window. The display 160 may include, for example, the upper-end non-display area 160a, a lower-end non-display area 160c, and a display area 160b interposed between the upper-end non-display area 160a and the lower-end non-display area 160c. The iris recognition sensors 50 may be disposed in the upper-end non-display area 160a. A home button, a fingerprint sensor or a pressure sensor may be disposed in the lower-end non-display area 160c. A printed circuit board having the processor 120, the memory 130, the communication interface 170, and the like mounted thereon may be disposed under the display area 160b. According to various embodiments, at least one of the processor 120, the memory 130, or the communication interface 170 may be disposed under the upper-end non-display area 160a. In addition, although the above description has been made in that the lower-end non-display area 160c is included, the present disclosure is not limited thereto. For example, the lower-end non-display area 160c may be substituted with the display area 160b.

The iris recognition sensors 50 may include a light emitting module 190 for the iris recognition sensor and an iris camera 180 (or a hybrid camera or a camera capturing an image based on at least one of infrared light or visible light) for the iris recognition sensor.

The light emitting module 190 may output light in a specified wavelength band (e.g., an infrared wavelength band, a near-infrared wavelength band, or a wavelength band in the range of 770 nm to 1400 nm) under the control of the processor 120. Light radiated from the light emitting module 190 may be reflected from an object (e.g., the face or the eyes of a user) provided in front of the light emitting module 190 and may be incident to the iris camera 180. The light emitting module 190 may output light having brightness of different intensities according to the types of functions performed based on the iris recognition sensors 50. For example, the electronic device 100 may support a proximity sensing function, a super proximity sensing function, an iris sensing function, or the like by using the iris recognition sensors 50. A super proximity sensing function include a function that a camera may be captured an object within a specific distance which is closer than a distance using in the proximity sensing function. For example, a first sensing distance for the super proximity sensing function may be shorter than a second sensing distance for the proximity sensing function. According to an embodiment, the first sensing distance for the super proximity sensing function may be 5 cm from the camera and the second sensing distance for the proximity sensing function may be 30 cm form the 5 cm (or the camera).

Power consumption in the super proximity sensing function may be less than that in the proximity sensing function. Power consumption in the proximity sensing function may be less than that in the iris sensing function. When the electronic device 100 performs the proximity sensing function (or the super proximity sensing function), the light emitting module 190 may output light having lower illuminance as compared to that when the electronic device 100 performs the iris sensing function, under the control of the processor 120. When the electronic device 100 performs the proximity sensing function, the light emitting module 190 may output light having higher illuminance as compared to that when the electronic device 100 performs the super proximity sensing function, under the control of the processor 120. According to various embodiments, the iris camera 180 may include a processor related to the control of a camera operation. The processor, which is a hardware processor, may be at least a portion of the above-described processor 120. In addition, the processor for the iris camera may be separately provided in relation to the driving of the iris camera 180. The processor for the iris camera may be configured to perform at least one of the proximity sensing function, the super proximity sensing function, or the iris sensing function through the communication with the processor 120.

The iris camera 180 may acquire an image based on light in at least one specified wavelength band. For example, the iris camera 180 may collect a portion, which is reflected from an object, of infrared light (IR) radiated from the light emitting module 190. The iris camera 180 may acquire the image based on the collected light. The iris camera 180 may collect visible light and may acquire an image based on the collected visible light. The iris camera 180 may include an image sensor, and the image sensor may partially operate according to a user function (or the type of an application) under execution. For example, when the electronic device 100 performs the iris sensing function, the iris camera 180 may operate the entire pixels (or pixels occupying a specific ratio among the entire pixels, for example, pixels corresponding to 80%, 90%, 95% or the like of the entire pixels) included in the image sensor. For example, when the electronic device 100 performs the proximity sensing function, the iris camera 180 may operate only some pixels (or pixels occupying a first specific ratio or less among the entire pixels, for example, pixels corresponding to 50%, 40%, 30% or the like of the entire pixels) included in the image sensor. For example, when the electronic device 100 performs the super proximity sensing function, the iris camera 180 may operate pixels (or pixels occupying a second specific ratio or less among the entire pixels, for example, pixels corresponding to 20%, 10% or the like of the entire pixels) fewer than pixels used when the electronic device 100 performs the proximity sensing function. According to various embodiments, the iris camera 180 may acquire an image related to iris sensing by using an infrared (IR) pass filter in the case that specified IR light is radiated from the light emitting module 190. In addition, the iris camera 180 may acquire an image based on visible light by using the IR pass filter when the electronic device 100 performs the proximity sensing function or the super proximity sensing function.

The communication interface 170 may be electrically connected with the processor 120 to output a signal or to receive a signal from the outside under the control of the processor 120. The communication interface 170 may include an antenna and a communication chip which transcieves a signal through the antenna. The communication interface 170 may transceive a signal in relation to a communication function of the electronic device 100. For example, the communication interface 170 may receive a call connection request signal from the outside or may transmit the call connection request signal to a base station. The communication interface 170 may transmit the call connection request signal to the processor 120 when receiving the call connection request signal.

The memory 130 may include at least one instruction set related to performing the specified user functions of the electronic device 100. For example, the memory 130 may include an instruction set related to the operation of the iris recognition sensors 50. The instruction set related to the operation of the iris recognition sensors 50 may include at least one of instructions related to the operation of the iris recognition sensors 50 when the electronic device 100 performs the super proximity sensing function, instructions related to the operation of the iris recognition sensors 50 when the electronic device 100 performs the proximity sensing function, instructions related to the operation of the iris recognition sensors 50 when the electronic device 100 performs the iris sensing function, or instructions related to the operation of the iris recognition sensors 50 when the electronic device 100 performs a call function.

The processor 120 may perform signal processing related to a specified user function based on at least one instruction or instruction set stored in the memory 130. At least a portion of the processor 120 may be provided in the form of hardware or software. According to an embodiment, the processor 120 may process a user function related to the operation of the iris recognition sensors 50. For example, the processor 120 may perform signal processing related to performing at least one of the super proximity sensing function, the proximity sensing function, and the iris sensing function.

Figure 2:
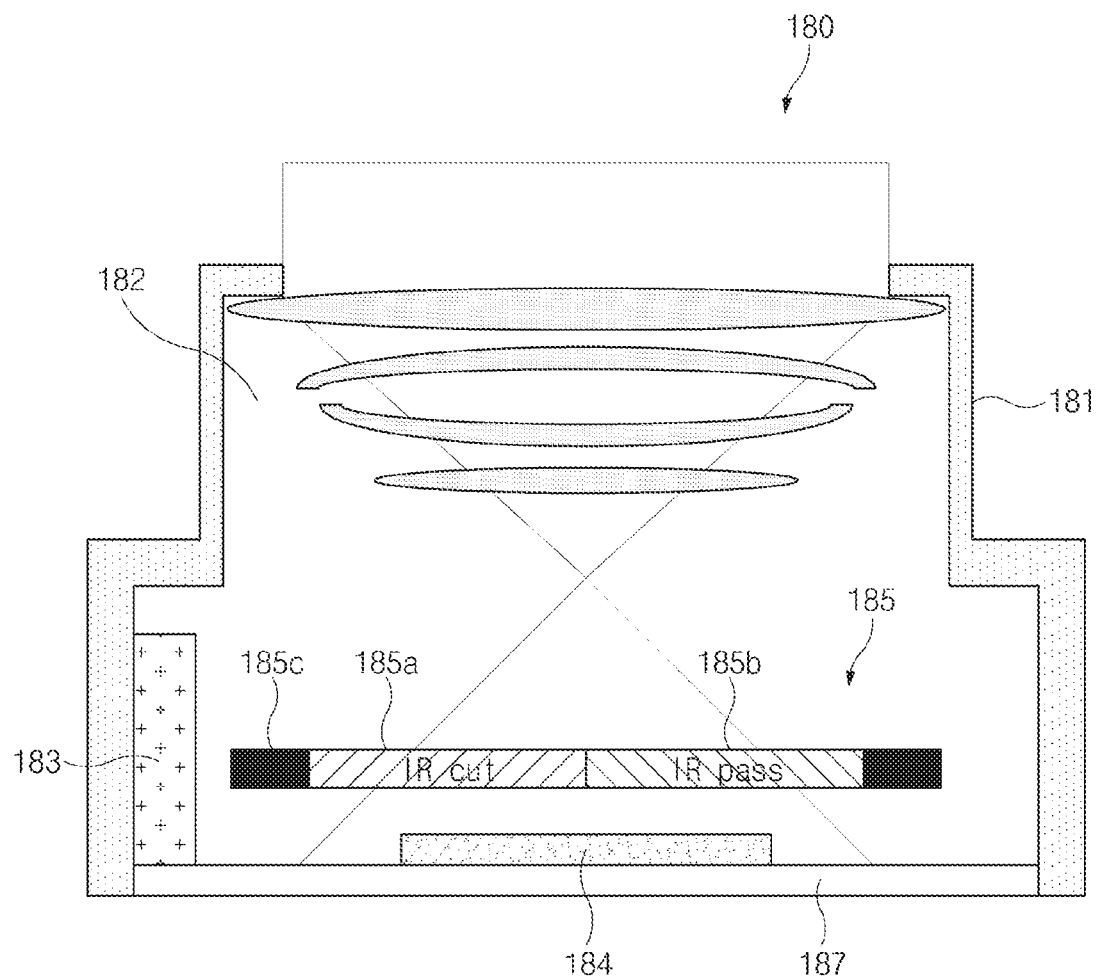
FIG. 2 is a view illustrating one example of an iris camera for the iris recognition sensor, according to an embodiment of the present disclosure.
Figure 3:
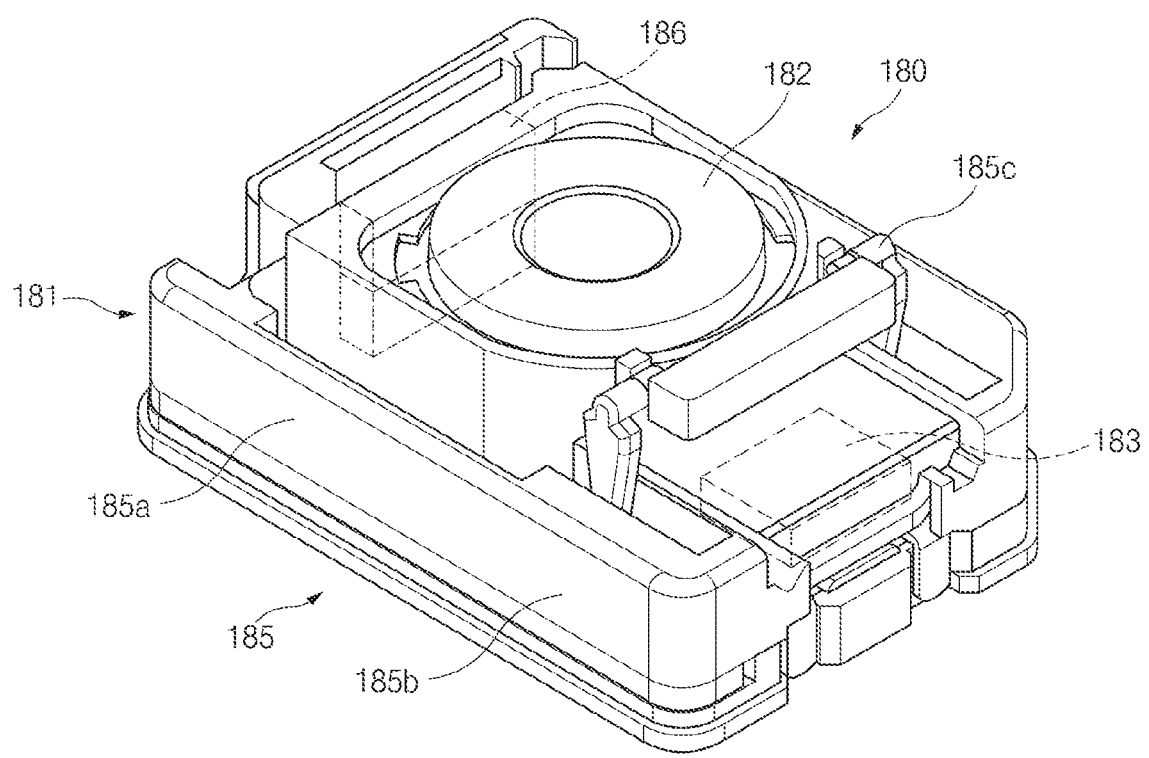
FIG. 3 is a view illustrating a simple example of the iris camera for the iris recognition sensor, according to an embodiment of the present disclosure.

FIG. 2 is a view illustrating one example of the iris camera for the iris recognition sensor, according to an embodiment of the present disclosure. FIG. 3 is a view illustrating a simple example of the iris camera for the iris recognition sensor, according to an embodiment of the present disclosure.

Referring to FIGS. 2 and 3, the iris camera 180 for the iris recognition sensor may include a substrate 187, an image sensor 184, a sensor housing 181, a lens unit 182, a filter module 185, a switching driving unit 183, and a magnetic member 186. In the following description, the iris camera 180 may be provided in the form of a hybrid camera which is able to perform at least one of an image capturing function or an IR photographing function. For example, the image sensor 184 may perform the image capturing function or the IR photographing function according to operations of the filter module 185. According to various embodiments, the electronic device 100 according to the present disclosure may include the iris camera 180 which performs only the IR photographing function and a camera which captures only an image.

The substrate 187 may have the image sensor 184 mounted thereon and may be disposed to face one side of the sensor housing 181 (e.g., an edge of the sensor housing 181). The switching driving unit 183 may be disposed at one side of the substrate 187. According to an embodiment, the substrate 187 may further include a signal line for supplying a signal necessary for driving the image sensor 184 and a signal line for transmitting a signal acquired by the image sensor 184 to the processor 120 of the electronic device 100.

The image sensor 184 may be provided on the substrate 187 to collect a signal corresponding to light passing through the lens unit 182. The image sensor 184 may have a plurality of pixels (e.g., photo diodes) arranged in a matrix form to acquire energy (e.g., light) come from light passing through the lens unit 182. According to an embodiment, the image sensor 184 may acquire an image corresponding to light in a specified wavelength band (e.g., a visible wavelength band, a near-infrared wavelength band, or an infrared wavelength band). The image sensor 184 may activate at least some pixels according to user functions (e.g., a proximity sensing function, a super proximity sensing function, an iris sensing function, or an image capturing function) of the electronic device 100 and may acquire the image based on the activated pixels. Alternatively, the electronic device 100 may capture an image based on the image sensor 184.

The sensor housing 181 may have a cylindrical shape in a hollow structure and may form an outer appearance of the iris camera 180. The image sensor 184, the lens unit 182, the filter module 185, the switching driving unit 183, or the like may be provided inside the sensor housing 181. The sensor housing 181 may have a hole formed in an upper end thereof such that at least a portion of the lens unit 182 is exposed through the hole. The sensor housing 181 may have an opening formed in a lower end thereof and the opening may be closed as the substrate 187 is disposed on the lower end of the sensor housing 181.

The lens unit 182 may include a plurality of lenses arranged at regular intervals and a barrel which fixes the lenses. An upper end of the lens unit 182 may be, for example, exposed through the hole in the sensor housing 181. The light introduced into the lens unit 182 through the upper end of the lens unit 182 may be transmitted to the image sensor 184. The filter module 185 may be interposed between the lens unit 182 and the image sensor 184.

The filter module 185 may include a first filter 185a, a second filter 185b, and switch supports 185c. The first filter 185a may include, for example, an IR cut filter (or a visible light pass filter). The second filter 185b may include, for example, an IR pass filter (or a visible light cut filter). The switch support 185c may support one side of the filter module 185 and may change the locations of the first filter 185a and the second filter 185b according to the operations of the switching driving unit 183.

The switching driving unit 183 may be disposed to physically make contact with one side of the filter module 185. The switching driving unit 183 may be physically connected with the switch support 185c of the filter module 185. The switching driving unit 183 may adjust the location of the switch support 185c under the control of the processor 120 or the control of a driving IC which drives the iris camera 180. As the location of the switch support 185c is changed (e.g., the switch support 185c laterally moves on the image sensor 184), the type of the filter disposed on the image sensor 184 may be varied. For example, on a drawing basis, when the switch support 185c moves rightward, the first filter 185a may be disposed on the image sensor 184. In this case, as the first filter 185a cuts off infrared light and passes visible light, light in a visible wavelength band is transmitted to the image sensor 184. For example, on a drawing basis, when the switch support 185c moves leftward, the second filter 185b may be disposed on the image sensor 184. In this case, as the second filter 185b passes only the infrared light, the image sensor 184 may collect infrared light. The location of the first filter 185a or the second filter 185b may be changed in relation to the user function of the iris camera 180. When the electronic device 100 performs the proximity sensing function or the super proximity sensing function, the switching driving unit 183 may operate to dispose the second filter 185b on the image sensor 184 under the control of the processor 120 (or the control of the driving IC of the iris camera 180). Accordingly, when the electronic device 100 performs the proximity sensing function or the super proximity sensing function, the electronic device 100 may determine a proximity state based on infrared light passing through the second filter 185b.

The magnetic member 186 may move up and down the lens unit 182. According to an embodiment, the magnetic member 186 may operate to move up and down the lens unit 182 inside the sensor housing 181 under the control of the processor 120 or the control of the driving IC of the iris camera 180, in relation to the focusing of the lens unit 182. In this regard, the iris camera 180 may further include a structure which applies a current to one side of the magnetic member 186 such that the magnetic member 186 forms a magnetic field or an electric field in a specific direction.

Figure 4:
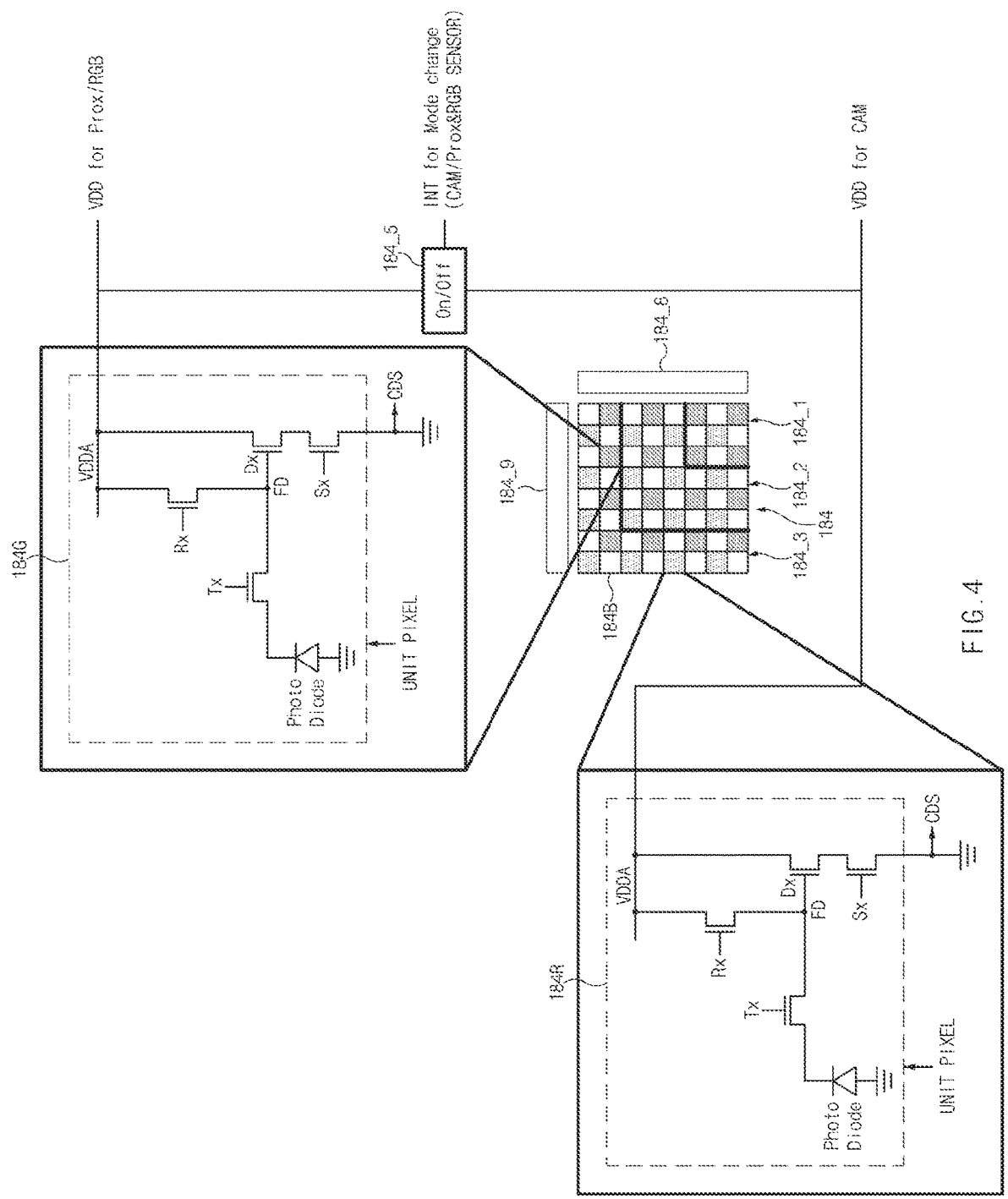
FIG. 4 is a view illustrating one example of an image sensor, according to an embodiment of the present disclosure.

FIG. 4 is a view illustrating one example of an image sensor, according to an embodiment of the present disclosure.

Referring to FIG. 4, the image sensor 184 may include unit pixels 184R, 184G, and 184B according to colors and a mode change switch 184_5. In addition, the image sensor 184 may further include control units (e.g., a column decoder 184_9 or a row decoder 184_8) which control supplying power to at least some of unit pixels 184G, 184R, and 184B and reading data from the at least some of unit pixels 184G, 184R, and 184B.

Each of the unit pixels 184G, 184R, and 184B may include, for example, a photo diode, at least one of switches Tx, Rx, Dx, Sx or the like related to the control of the photo diode, a reference voltage line VDDA for supplying a reference voltage, and an output line CDS for outputting data stored in the photo diode.

The mode change switch 184_5 may be disposed to turn on only some of the unit pixels 184R, 184G, and 184B under the control of the processor 120 (or the sensor driving unit or the sensor IC related to the driving of the image sensor 184). For example, the mode change switch 184_5 may be disposed to turn on only pixels (e.g., pixels 184G) for a first color, which are included in the image sensor 184. In addition, the mode change switch 184_5 may be disposed to turn on only pixels 184R for a second color or only pixels 184B for a third color. For example, the mode change switch 184_5 may turn on the pixels (e.g., pixels 184R, 184G, and 184B) for the whole colors under the control of the processor 120 in iris sensing. For example, the mode change switch 184_5 may turn on pixels for some colors (two colors) under the control of the processor 120 in proximity sensing. For example, the mode change switch 184_5 may turn on pixels (e.g., the pixels 184R, 184G, or 184B) for one color under the control of the processor 120 in super proximity sensing.

For example, the control units 184_8 and 184_9 may partially drive the unit pixels 184R, 184G, and 184B. For example, the control units 184_8 and 184_9 may turn on unit pixels arranged in a first area 184_1, a second area 184_2, and a third area 184_3 corresponding to an application being executed or under the control of the processor 120.

According to an embodiment, the first area 184_1 may include an area in which only some of pixels included in the image sensor 184 are driven. The first area 184_1 may be selected in the request for a super proximity sensing operation. Although FIG. 4 illustrates that the first area 184_1 is located at a portion of a lower right area of the image sensor 184, the present disclosure is not limited thereto. For example, the first area 184_1 may be located at the center of the image sensor 184.

The second area 184_2 may include an area wider than that of the first area 184_1 and narrower than that of the third area 184_3. The second area 184_2 may be selected in the request for a proximity sensing operation. The super proximity sensing operation may include an operation of sensing the proximity of an object at a distance shorter than that in the proximity sensing operation (e.g., the distance is 5 cm in the case of the proximity sensing operation and 1-2 cm in the case of the super proximity sensing operation). According to various embodiments, for example, the second area 184_2 may be located at the center of the image sensor 184.

The third area 184_3 may include the entire pixels in the image sensor 184. The third area 184_3 may be selected in the request for an iris sensing operation.

According to various embodiments, operation manners according to pixel types and operation manners according to areas may be used together. For example, in relation to performing a specified user function (e.g., the super proximity sensing function or the proximity sensing function), only a specified type of unit pixels 184R, 184G or 184B among pixels disposed in the second area 184_2 may be operated. In addition, the above manners may be mixed based on an external condition. For example, if an external illuminance is a specified illuminance or more, the processor 120 may be configured to operate only some types of pixels 184G (or only pixels provided in number corresponding to a use ratio less than that of pixels operated in the iris sensing function) in the second area 184_2 in the proximity sensing function. Alternatively, if the external illuminance is less than the specified illuminance, the processor 120 may be configured to operate the entire pixels in the second area 184_2 in the proximity sensing function. The above operation of some pixels or the entire pixels in the relevant area based on the external illuminance may be applied to the iris sensing function or the super proximity sensing function.

Figure 5:
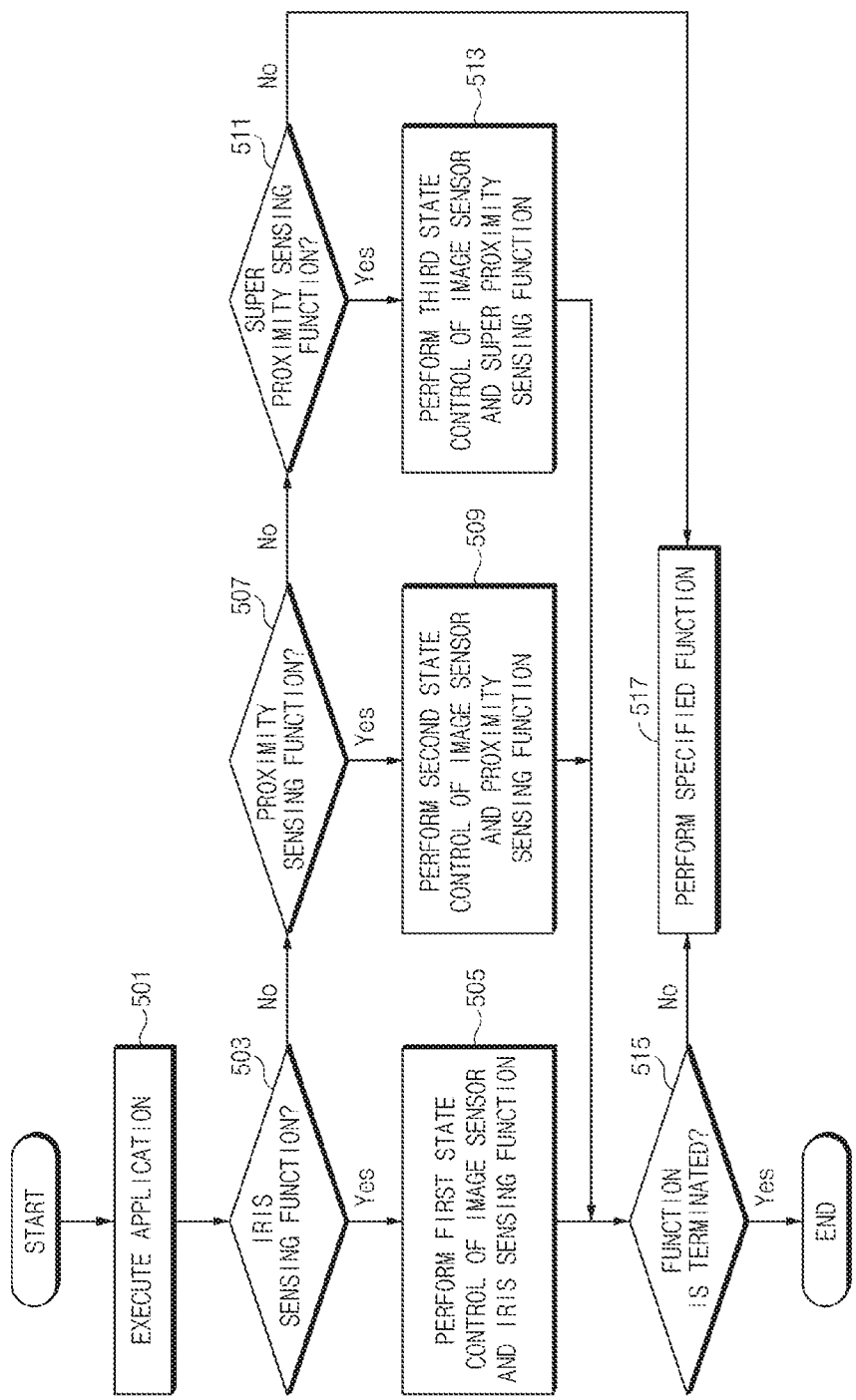
FIG. 5 is a flowchart illustrating a method of operating an electronic device, according to an embodiment of the present disclosure.

FIG. 5 is a flowchart illustrating a method of operating an electronic device, according to an embodiment of the present disclosure.

Referring to FIG. 5, according to the method of operating the electronic device 100 of the present disclosure, in operation 501, the processor 120 may execute an application according to a user input or specified scheduling information. For example, the processor 120 may execute an application related to a call function in the case that the processor 120 receives a call request from the outside and a user accepts the call request, or in the case that the user attempts to connect a call. In addition, the processor 120 may execute a lock-screen application executed based on iris sensing. Further, the processor 120 may execute a finance related application executed based on the iris sensing.

In operation 503, the processor 120 may determine whether an event, which occurs according to the execution of an application, is related to the iris sensing function. If the event is related to the iris sensing function, the processor 120 may perform first state control of the image sensor 184 and the iris sensing function in operation 505. For example, if the application related to the iris sensing function is executed, the processor 120 may perform the first state control of the image sensor 184. For example, as described with reference to FIG. 4, the first state control of the image sensor 184 may include a state control for operating pixels of the third area 184_3 by the processor 120. Alternatively, the first state control of the image sensor 184 may include a state control for operating the entire pixels included in the image sensor 184. According to various embodiments, the processor 120 may control the switching driving unit 183 to dispose the second filter 185b on the image sensor 184. The processor 120 may control the light emitting module 190 to transmit an IR signal having a specified brightness. The iris camera 180 may acquire an image of an object, which is present in a specified direction, under the control of the processor 120.

If the event is not related to the iris sensing function, the processor 120 determines whether the event is related to the proximity sensing function in operation 507. For example, the processor 120 may determine whether the event is related to the execution of a call function application related to the proximity sensing function. Alternatively, the processor 120 may determine whether the event is related to the execution of a gesture recognition application using the proximity sensing function. If the event occurs in relation to the proximity sensing function, the processor 120 may perform second state control of the image sensor 184 and the proximity sensing in operation 509. The second state control of the image sensor 184 may include a state control related to the operation for the second area 184_2 of the image sensor 184 described with reference to FIG. 4. The state control may include a state control (e.g., the control of the column decoder 184_9 or the row decoder 184_8) for activating the pixels disposed in the second area 184_2 in relation to the operation of the pixels disposed in the second area 184_2 and for acquiring signals by the pixels disposed in the second area 184_2. According to various embodiments, the processor 120 may process image acquisition by using pixels (e.g., pixels 184G) corresponding to a specified color or a specified type of pixels (e.g., pixels 184G) among the entire pixels included in the image sensor 184, in relation to proximity sensing. According to various embodiments, the processor 120 may control the switching driving unit 183 to dispose the second filter 185b (e.g., a filter (IR pass filter) related to passing IR light) on the image sensor 184. The processor 120 may acquire and analyze IR light at a specific period by using some pixels of the image sensor 184, thereby determining the proximity sensing.

If the event is not related to the proximity sensing function, the processor 120 may determine whether the event is related to the super proximity sensing function in operation 511. For example, the processor 120 may determine the event as being an event occurring in relation to the super proximity sensing function in a call connection state while the call connection function is being performed. If the event is determined as being the event occurring in relation the super proximity sensing function, the processor 120 may perform third state control of the image sensor 184 and the super proximity sensing function in operation 513. The third state control may include a state control for using pixels disposed in the first area 184_1 as described with reference to FIG. 4. In addition, the third state control may include a state control for using pixels, which are fewer than those in the second state control, among the pixels disposed in the image sensor 184. The state control may include a state control for configuring the control units (e.g., the column decoder 184_9 or the row decoder 184_8) to acquire information on some pixels, which are to be subject to the state control, in the first area 184_1 as described above. In addition, the state control may include a state control (e.g., amplifier current control allocated to some pixels) for activating some pixels in the first area 184_1. The processor 120 may determine whether an object is in proximity to a specified super proximity distance or less, by using some pixels in the first area 184_1. In relation to the super proximity sensing function, the processor 120 may control the second filter 185b (e.g., the IR pass filter) to be disposed on the image sensor 184.

After the iris sensing function, the proximity sensing function, or the super proximity sensing function is performed as described above, the processor 120 may determine whether a function termination event related to the application occurs in operation 515. If the function termination event does not occur, the processor 120 may perform a specified function after the iris sensing function, the proximity sensing function, or the super proximity sensing function is performed. According to various embodiments, if the event is not determined as being related to the super proximity sensing function in operation 511, the processor 120 may perform a function based on the type of the event in operation 517.

According to various embodiments, the processor 120 may operate the iris recognition sensor such that the iris recognition sensor helps the operation of the proximity sensor or the super proximity sensor. For example, in signal processing related to the proximity sensing function or the super proximity sensing function, the processor 120 may activate the proximity sensor or the super proximity sensor and may activate at least a portion of the image sensor for the iris sensing function. Accordingly, the processor 120 may acquire a first signal by using the proximity sensor or the super proximity sensor and may acquire a second signal by using an image sensor for the iris sensing function. The processor 120 may determine the proximity state (super proximity state) of an object based on the first signal and the second signal which are acquired.

According to various embodiments, the electronic device may include a housing including a first surface that is open in a first direction and a second surface that is disposed in a second direction, a display including a window disposed on the first surface that is open, a light emitting module disposed under the window to radiate light related to a iris sensing function, a camera disposed under the window and spaced apart from the light emitting module by a specific distance and a processor electrically connected with the light emitting module and the camera, wherein the processor is configured to selectively perform at least one of the iris sensing function, a proximity sensing function or a super proximity sensing function based on the camera according to a type of an application which is requested to be executed.

According to various embodiments, the processor may be configured to increase an intensity of the light radiated from the light emitting module in a state of performing the iris sensing function rather than the proximity sensing function.

According to various embodiments, the processor may be configured to increase an intensity of light radiated from the light emitting module in a state of performing the proximity sensing function rather than the super proximity sensing function.

According to various embodiments, the processor may be configured to process the iris sensing function by using entire pixels included in an image sensor.

According to various embodiments, the processor may be configured to process the proximity sensing function by using pixels that occupy a specific ratio among entire pixels included in an image sensor, or by using some types of pixels among the entire pixels.

According to various embodiments, the processor may be configured to process the super proximity sensing function by using pixels fewer than the pixels used for the proximity sensing function.

According to various embodiments, the processor may be configured to divide an image sensor into a plurality of areas and process the iris sensing function by using pixels included in entire areas of the image sensor.

According to various embodiments, the processor may be configured to process the proximity sensing function by using pixels included in some areas of the plurality of areas.

According to various embodiments, the processor may be configured to process the super proximity sensing function by using pixels in an area narrower than the areas used for the proximity sensing function.

According to various embodiments, the camera may include an image sensor, a first filter selectively disposed on the image sensor to pass a visible light, a second filter selectively disposed on the image sensor to pass an infrared light and a switching driving unit configured to switch a location of the first filter or a location of the second filter.

According to various embodiments, the processor may be configured to dispose the second filter on the image sensor when performing the iris sensing function, the proximity sensing function, or the super proximity sensing function.

According to various embodiments, the light emitting module and the camera are disposed in a non-display area of the display.

According to various embodiments, the electronic device may include a housing including a first surface that is open in a first direction and a second surface that is disposed in a second direction, a display including a window disposed on the first surface that is open, a light emitting module disposed under the window to radiate light related to iris sensing, a camera disposed under the window and spaced apart from the light emitting module by a specific distance, a proximity sensor disposed under the window and a processor electrically connected with the proximity sensor, the light emitting module, and the camera, wherein the processor is configured to perform a control operation to perform an iris sensing function and a super proximity sensing function based on the camera or to perform a proximity sensing function based on the proximity sensor, according to a type of an application which is requested to be executed.

According to various embodiments, the processor may be configured to perform the proximity sensing function by using the camera if the application is related to execution of a call function.

According to various embodiments, the processor may be configured to perform the proximity sensing function by using some pixels among entire pixels included in an image sensor of the camera.

According to various embodiments, the processor may be configured to perform the proximity sensing function by activating the proximity sensor if an object sensed by using the camera has proximity within a specified first distance.

According to various embodiments, the processor may be configured to activate the camera as the proximity sensor is activated.

According to various embodiments, the processor may be configured to measure illuminance or to sense the proximity of an object by using at least one of an illuminance sensor or an iris camera having the IR pass filter disposed on the image sensor of the iris camera.

Figure 6:
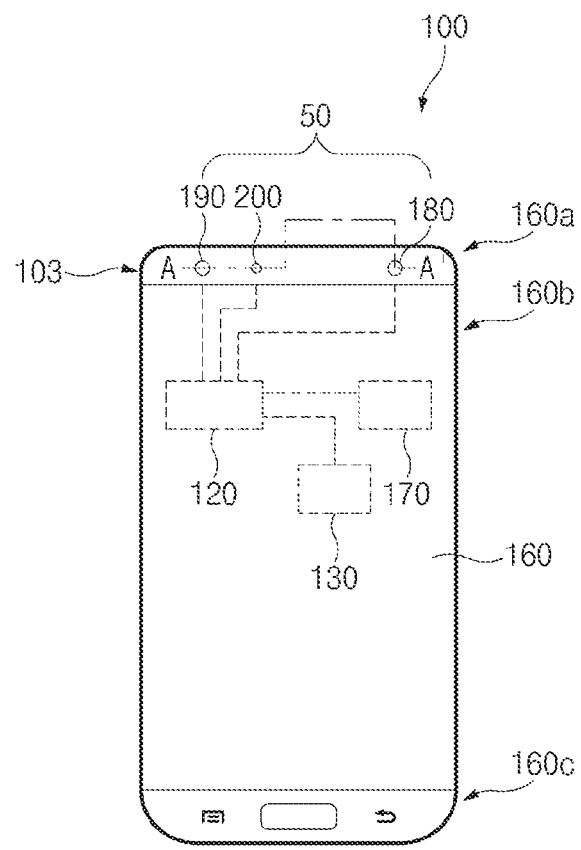
FIG. 6 is a view illustrating another example of an electronic device, according to an embodiment of the present disclosure.
Figure 7:
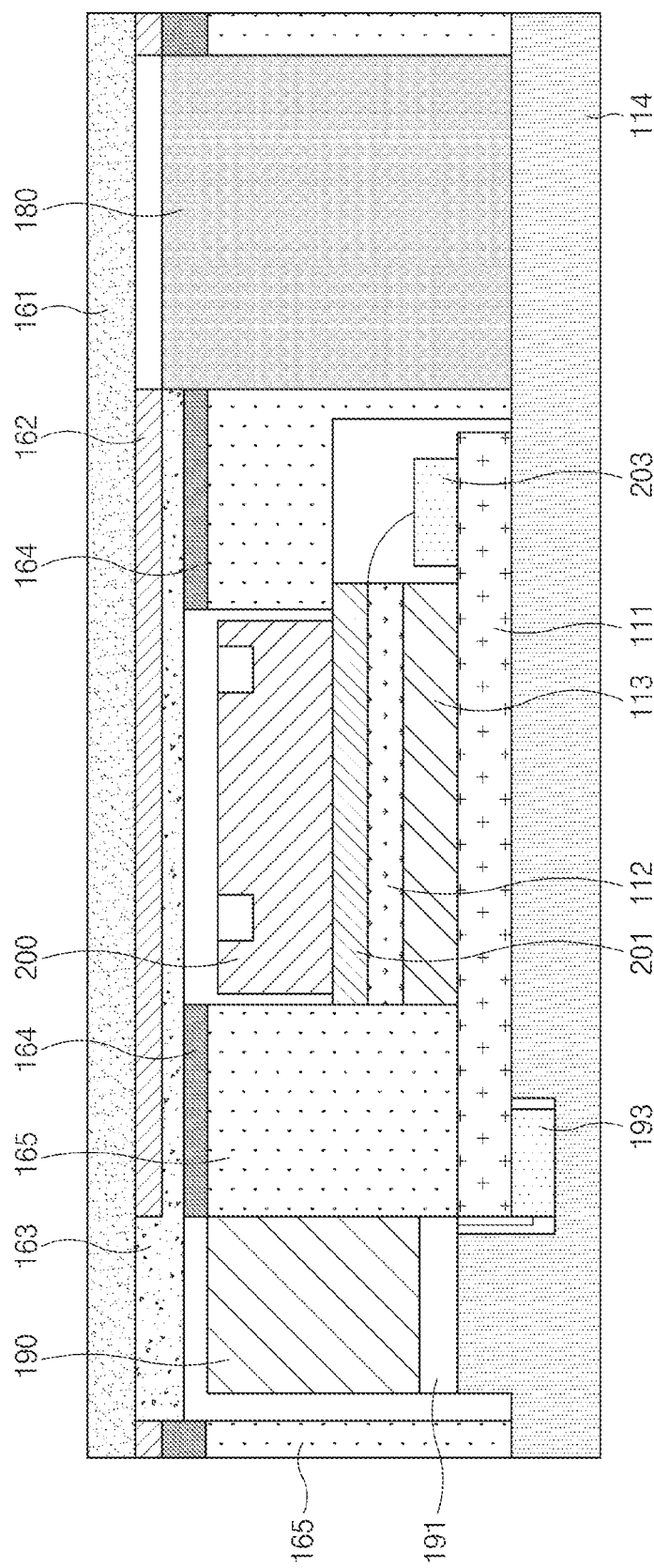
FIG. 7 is a view illustrating one sectional surface of the electronic device, according to an embodiment of the present disclosure.

FIG. 6 is a view illustrating another example of an electronic device, according to an embodiment of the present disclosure. FIG. 7 is a view illustrating one sectional surface of the electronic device, according to an embodiment of the present disclosure.

Referring to FIGS. 6 and 7, an electronic device 100 may include a housing 103, a display 160, iris recognition sensors 50 (including a light emitting module 190 for the iris recognition sensor and an iris camera 180 (or a hybrid camera or a camera capturing an image based on at least one of infrared light or visible light) for the iris recognition sensor), a proximity sensor 200, a processor 120, a memory 130, a communication interface 170, a bracket 165, a rear substrate 114, and a main printed circuit board 111. The communication interface 170 and the iris recognition sensors 50 may include elements identical to or similar to those described with reference to FIGS. 1 to 4. According to various embodiments, although drawings illustrate that the proximity sensor 200 is observed, the present disclosure is not limited thereto. Since the proximity sensor 200 is disposed under a printing layer and a window, the proximity sensor 200 may not be observed, when viewed from the top of the window. According to various embodiments, the proximity sensor 200 may include a proximity-sensing light emitting unit which radiates specified light and a proximity-sensing light receiving unit, in relation to the proximity sensing. Alternatively, at least one of the proximity-sensing light emitting unit, the proximity-sensing light receiving unit, and the illuminance sensor may be disposed at a location indicated for the proximity sensor 200. When viewed from the top of the window, the illuminance sensor may not be observed as the illuminance sensor is disposed under the printing layer and the window. In addition, at least one of a proximity sensor (e.g., IR light based sensor) or a proximity-sensing RGB sensor may be disposed in an area corresponding to the proximity sensor 200.

The display 160 may include an upper-end non-display area 160*a* and a display area 160*b*. In the upper-end non-display area 160*a*, a window 161, a printing layer 162, an IR ink layer 163, a black layer 164, an iris recognition sensor (a light emitting module 190 and an iris camera 180), and a proximity sensor 200 may be disposed. The display area 160*b* may include the entire area of a front surface except for the upper-end non-display area 160*a*.

A first flexible substrate 191 may be disposed at one side of the light emitting module 190 to supply power and a signal to the light emitting module 190. The first flexible substrate 191 may be electrically connected with a main printed circuit board 111. For example, the first flexible substrate 191 may be electrically connected with a module IC 193 disposed on the main printed circuit board 111. The window 161 and the IR ink layer 163 may be disposed on the light emitting module 190. Accordingly, an outer appearance of the light emitting module 190 may be observed in the form of an oval (or circular) hole. The light emitting module 190 may radiate light (e.g., IR light) in a specified wavelength band according to the type of a user function.

Only the window 161 may be disposed on the iris camera 180. The iris camera 180 may acquire an image related iris sensing in the case that the IR light is radiated from the light emitting module 190. The iris camera 180 may be deactivated when the proximity sensor 200 is operated.

A second flexible substrate 201 may be disposed at one side of the proximity sensor 200 (or an RGB sensor) to supply power and a signal related to the driving of the proximity sensor 200. The second flexible substrate 201 may be electrically connected with the main printed circuit board 111. For example, the second flexible substrate 201 may be electrically connected with a sensor IC 203 disposed on the main printed circuit board 111. For example, the proximity sensor 200 may include the proximity-sensing light emitting unit and the proximity-sensing light receiving unit for proximity sensing. The IR ink layer 163, the printing layer 162, and the window 161 may be stacked on the proximity sensor 200. Accordingly, the black layer 164 may be disposed around the proximity sensor 200. An area that the proximity sensor 200 is disposed has a color identical to or similar to that of a peripheral portion thereof due to the printing layer 162. Accordingly, the location that the proximity sensor 200 is disposed may not be observed actually when viewed from the outside. The proximity sensor 200 may perform the proximity sensing function to sense the proximity of an object within a specified first distance and may perform the super proximity sensing function to sense the proximity of an object within a specified second distance (e.g., a distance shorter than the first distance).

The module IC 193 related to the driving of the light emitting module 190 and the sensor IC 203 related to the driving of the proximity sensor 200 may be mounted on the main printed circuit board 111. The module IC 193 may be electrically connected with the first flexible substrate 191. The sensor IC 203 may be electrically connected with the second flexible substrate 201. According to various embodiments, the iris camera 180 may be electrically connected with the main printed circuit board 111 and may be driven by the processor 120 mounted on the main printed circuit board 111. In addition, the electronic device 100 may further include a support plate 112 and a subscriber identification module (SIM) socket 113 disposed under the second flexible substrate 201.

For example, the processor 120 may perform signal processing related to the execution of at least one of the proximity sensing function, the super proximity sensing function, or the iris sensing function. For example, if the request for the execution of a function related to the iris sensing is received (e.g., an application, for which the iris sensing is requested, is executed), the processor 120 may control the light emitting module 190 to radiate light (IR light) in a specified wavelength band and may control the iris camera 180 to acquire an image. The processor 120 may compare the image acquired by the iris camera 180 with reference information, which is stored, (e.g., iris registration information or information on a minutiae of an iris of a user stored in advance in the memory 130) to verify the iris of the user. According to various embodiments, if an application (e.g., a call function application) related to the proximity sensing is executed, the processor 120 may activate the proximity sensor 200 to detect the proximity of an object. If the proximity of the object is within a specified distance, the processor 120 may execute a function based on proximity sensing (e.g., the processor 120 may turn off the display 160). Alternatively, the processor 120 may sense the proximity of the object by using the iris recognition sensors 50. If the proximity of the object is within a specified distance, the processor 120 may activate the proximity sensor 200 and may process the proximity sensing. In this operation, the processor 120 may deactivate the iris recognition sensors 50 if the proximity sensor 200 is activated. Alternatively, the processor 120 may simultaneously drive the proximity sensor 200 and the iris recognition sensors 50 to detect the proximity of the object by integrally considering the information acquired by the proximity sensor 200 and the information acquired by the iris camera 180.

According to various embodiments, the processor 120 may operate at least one of the proximity sensor 200 and the iris recognition sensors 50 corresponding to external illuminance. For example, the processor 120 may measure external illuminance by using an illuminance sensor included in the electronic device 100. If the measured external illuminance is less than a specified illuminance, the processor 120 may process the proximity sensing by using the iris recognition sensors 50 or by using the proximity sensor 200 and the iris recognition sensors 50. If the external illuminance is equal to or more than the specified illuminance, the processor 120 may process proximity sensing by using only the proximity sensor 200.

According to various embodiments, regarding super proximity sensing, if the proximity of the object is within a specified distance, the processor 120 may process the super proximity sensing by using an element representing lower power consumption. For example, if power for operating only some pixels of the iris camera 180 is lower than power for operating the proximity sensor 200, the processor 120 may process the super proximity sensing by using the iris camera 180. In this operation, the processor 120 may control an IR pass filter to be disposed on the image sensor of the iris camera 180 and may process the super proximity sensing by using at least some pixels of the image sensor 184.

As described above, the processor 120 may selectively operate at least one of the iris recognition sensors 50 and the proximity sensor 200 in relation to the proximity sensing function, the super proximity sensing function, or the iris sensing function. Additionally or alternatively, the processor 120 may auxiliary operate the iris camera 180 in relation to the operation of the illuminance sensor. For example, if the external illuminance sensed by using the illuminance sensor is detected as less than a specified value, the processor 120 may perform the illuminance sensing by using the iris camera 180. If the external illuminance sensed by the illuminance sensor is equal to or more than the specified value, the processor 120 may process a specified function of the electronic device 100 based on the illuminance value acquired by the illuminance sensor without operating the iris camera 180.

As described above, according to various embodiments, an electronic device may include a housing including a first surface that is open in a first direction and a second surface that is disposed in a second direction, a display including a window disposed on the first surface that is open, a light emitting module disposed under the window to radiate light related to iris sensing, a camera disposed under the window and spaced apart from the light emitting module by a specific distance, an illuminance sensor disposed under the window, a processor electrically connected with the illuminance sensor, the light emitting module, and the camera. The processor may be configured to activate the illuminance sensor as the execution of an application is requested, to measure illuminance by using an iris camera having an IR pass filter disposed on an image sensor of the iris camera if an illuminance value measured by the illuminance sensor is less than a first illuminance value, and to acquire an image by turning on the entire pixels in the image sensor when capturing the image by using the iris camera, if the illuminance value sensed by using the iris camera is less than the specified value.

According to various embodiments, the process may be configured to acquire an image by turning on some pixels in the image sensor when capturing the image by using the iris camera, if the illuminance value sensed by using the iris camera is equal to or more than the specified value.

Figure 8:
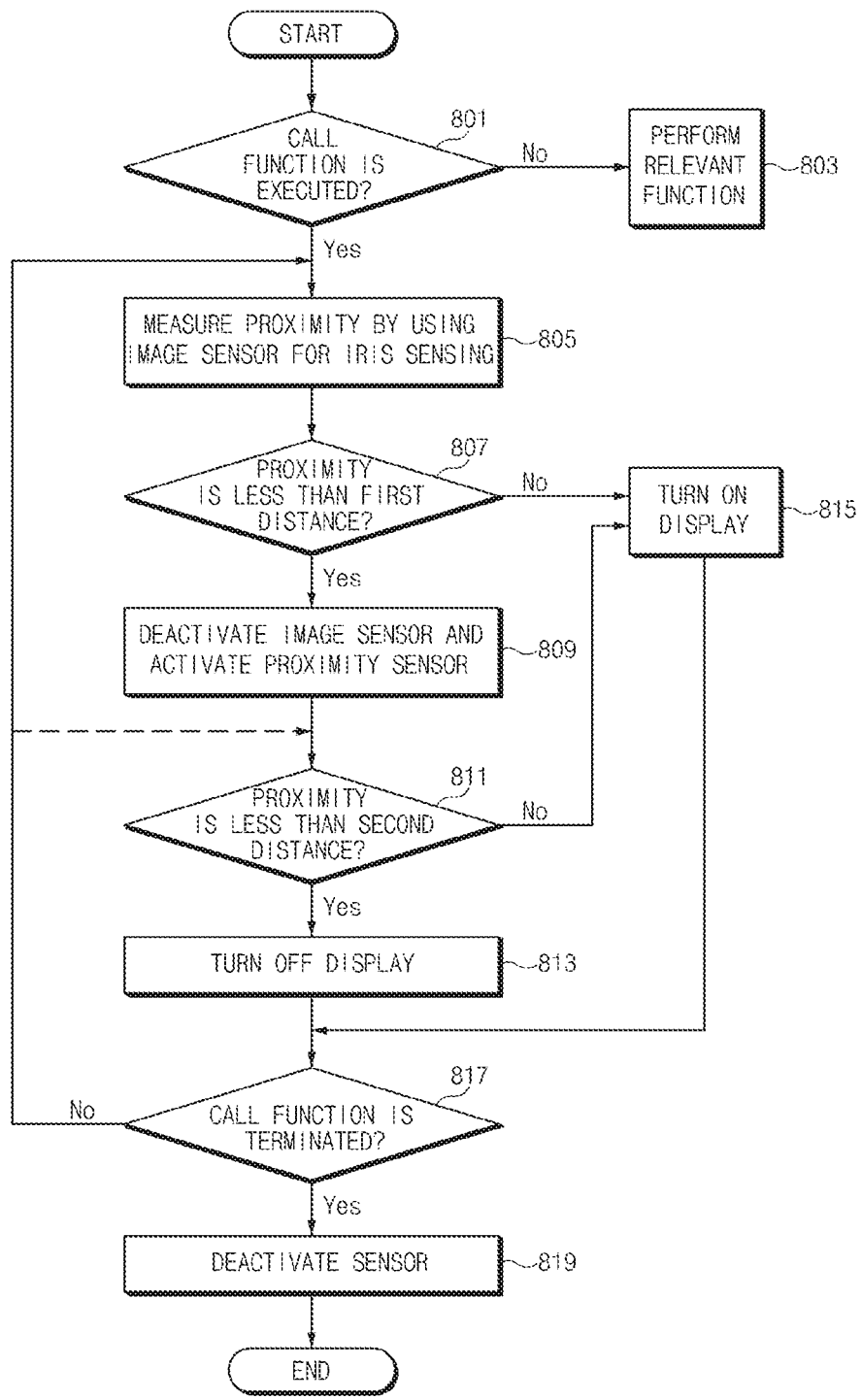
FIG. 8 is a flowchart illustrating another example of a method of operating an electronic device, according to an embodiment of the present disclosure.

FIG. 8 is a flowchart illustrating another example of a method of operating an electronic device, according to an embodiment of the present disclosure.

Referring to FIG. 8, according to the method of operating the electronic device 100 of the present disclosure, in operation 801, if an event occurs, the processor 120 may determine whether the event is related to the execution of a call function. According to various embodiments, if the event is not related to the execution of the call function, the processor 120 may process the execution of a function based on the type of the event in operation 803. For example, the processor 120 may process a Web surfing function, a file editing function, or an audio or video reproduction function according to the type of the event.

According to various embodiments, if the event is related to the execution of the call function, the processor 120 may measure the proximity of an object by using an image sensor for iris sensing in operation 805. In this regard, the processor 120 may control the IR pass filter of the iris camera 180 to be disposed on the image sensor 184. The processor 120 may determine the proximity of the object based on information acquired by the image sensor 184. In this operation, the processor 120 may receive IR light to analyze the proximity of the object by using a partial area (e.g., some pixels or pixels corresponding to some colors) of the image sensor 184 and may determine the proximity of the object based on the received IR light.

According to various embodiments, in operation 807, the processor 120 may determine whether the proximity of the object is less than the first distance. If the measured proximity of the object is less than a first distance, the processor 120 may deactivate the image sensor 184 and may activate the proximity sensor 200 in operation 809. Accordingly, the electronic device 100 may more accurately measure the proximity by using the image sensor 184 which represents higher power consumption. Under the condition that the proximity is less than the first distance, the electronic device 100 may determine whether the object is maintained in the proximity state or whether the object is closer to a specified position (e.g., the face or the cheek of a user) with lower power consumption.

According to various embodiments, in operation 811, the processor 120 may determine whether the proximity of the object is less than a second distance. The second distance may be shorter than the first distance. If the measured proximity of the object is less than the second distance, the processor 120 may control the display 160 to be turned off in operation 813. According to various embodiments, the processor 120 may turn off the display 160 under the condition that the proximity of the object is less than the first distance. If the proximity of the object is the second distance shorter than the first distance, the processor 120 may turn off the proximity sensor 200 and may determine the super proximity sensing by using some pixels (e.g., pixels fewer than pixels used in the proximity sensing) of the iris camera 180.

According to various embodiments, if it is determined the proximity measured by using the image sensor is equal to or more than the first distance in operation 807, or if it is determined that the proximity measured by using the proximity sensor is equal to or more than the second distance in operation 811, the processor 120 may maintain the display 160 in the turn-on state in operation 815.

According to various embodiments, the processor 120 may determine whether an event occurs in relation to the termination of the call function in operation 817 after the display is maintained in the turn-on state. If the call function is not terminated, the processor 120 may branch to operations prior to operation 805 or operation 811 according to previous states and may perform the subsequent operations. While the processor 120 maintains the display 160 in the turn-off state, the processor 120 may deactivate the iris camera 180 used in the super proximity sensing and may activate the proximity sensor 200 again, according to the change of the proximity. In addition, the processor 120 may deactivate the proximity sensor 200 used in the proximity sensing and may activate the iris camera 180, according to the change of the proximity.

According to various embodiments, if the event occurs in relation to the termination of the call function, the processor 120 may process sensor deactivation in operation 819. For example, the processor 120 may deactivate the image sensor for iris sensing or may deactivate the proximity sensor.

According to various embodiments, a method of operating an electronic device may include receiving a request for execution of a call function application based on a communication interface, activating a camera corresponding to the request for the execution of the call function application, performing proximity sensing by using the camera, activating a proximity sensor if an object has proximity within a specified first distance and performing the proximity sensing by using the proximity sensor.

According to various embodiments, the method may further include turning off a display if the proximity measured by using the proximity sensor is within a specified second distance or performing the proximity sensing by using the camera if the proximity measured by using the proximity sensor exceeds the specified second distance.

Figure 9:
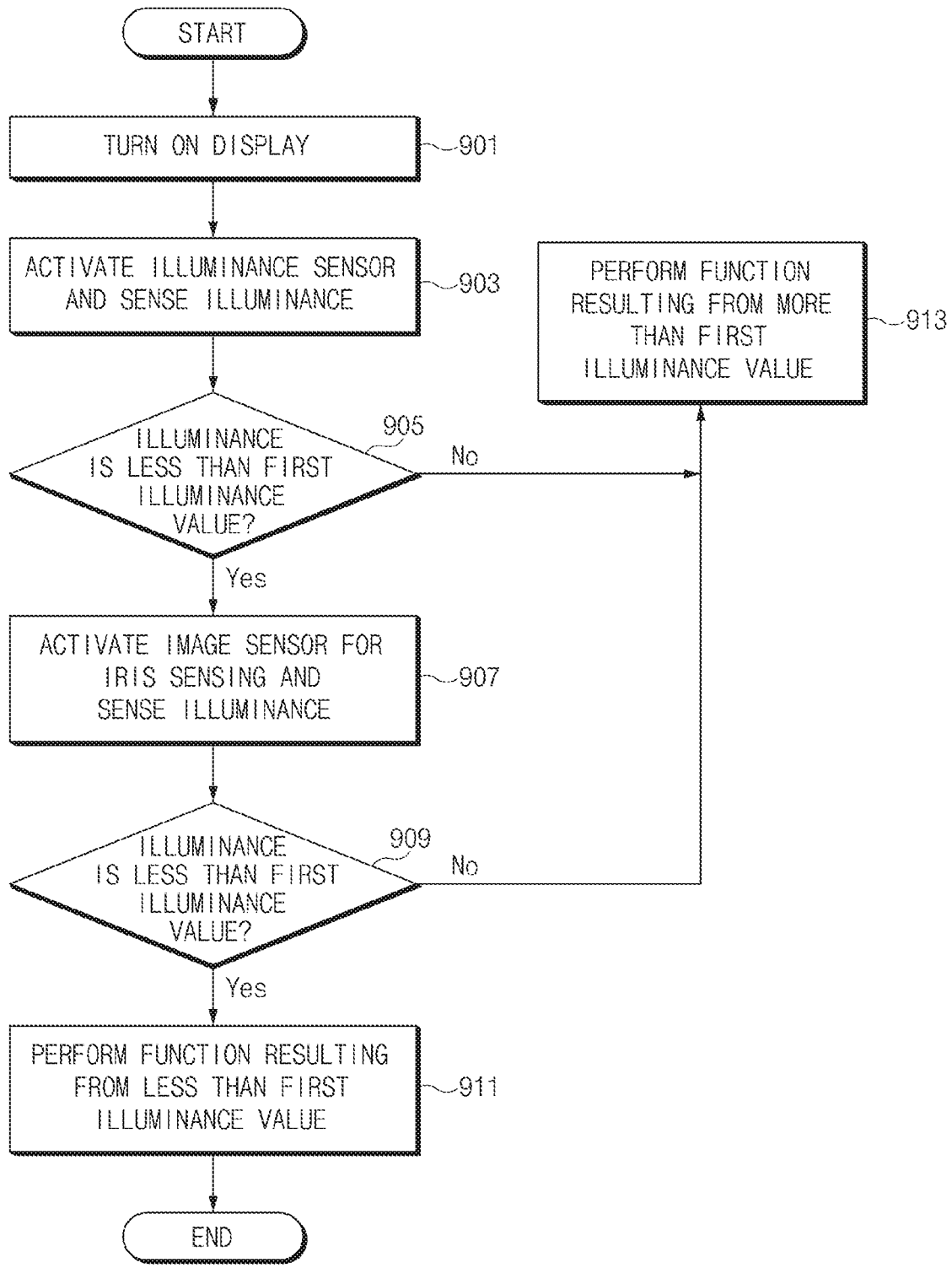
FIG. 9 is a flowchart illustrating another example of a method of operating an electronic device, according to an embodiment of the present disclosure.

FIG. 9 is a flowchart illustrating another example of a method of operating an electronic device, according to an embodiment of the present disclosure.

Referring to FIG. 9, according to the method of operating the electronic device 100 of the present disclosure, in operation 901, the processor 120 may turn on the display 160 according to a user input or a specified event. According to various embodiments, if the display 160 is turned on, the processor 120 may activate the illuminance sensor to sense illuminance in operation 903.

According to various embodiments, in operation 905, the processor 120 may determine whether the sensed illuminance value is less than a first illuminance value. If the sensed illuminance value is less than the first illuminance value, the processor 120 may activate the image sensor for iris sensing in operation 907. The processor 120 may process illuminance sensing based on the activated image sensor. In this regard, the processor 120 may control the second filter 185b (e.g., the IR pass filter) to be disposed on the image sensor and may process illuminance sensing based on quantity of IR light passing through the second filter 185b and collected by the image sensor.

According to various embodiments, the processor 120 may determine whether the illuminance value sensed by using the image sensor is less than the first illuminance value in operation 909. If the illuminance value sensed by using the image sensor is less than the first illuminance value, the processor 120 may process the execution of a function corresponding to less than the first illuminance value in operation 911. For example, in the case that the processor 120 captures an image using the image sensor, the processor 120 may capture the image by turning on the entire pixels included in the image sensor. For example, in the case that the processor 120 senses an iris using the image sensor, the processor 120 may sense the iris by turning on the entire pixels included in the image sensor. According to various embodiments, the processor 120 may process the brightness of the display 160 to a specified first brightness.

According to various embodiments, if it is determined that the sensed illuminance value is equal to or more than the first illuminance value in operation 905 or operation 909, the processor 120 may execute a function corresponding to the first illuminance value or more in operation 913. For example, in the iris sensing, the processor 120 may turn on only some pixels among pixels included in the image sensor to sense the iris. According to various embodiments, if the measured illuminance value is equal to or more than the first illuminance value, the processor 120 may change the brightness of the display 160 to a specified second brightness (e.g., the second brightness is greater than the first brightness).

As described above, in the electronic device according to an embodiment of the present disclosure, a new window structure may be provided to prevent a hole for the proximity sensor or the illuminance sensor from being observed from the outside. For example, according to an embodiment of the present disclosure, the hole may be formed in a hole area of the window (or the cover glass) of the electronic device, in which the proximity/illuminance sensor is disposed, by applying IR ink suitable for colors while maintaining a molding pattern of a film and a color layer to ensure IR transmittance.

The electronic device may include an image sensor which is capable of separately driving pixels for proximity/illuminance and may include a power supply circuit which is capable of operating at least one of illuminance sensing and proximity sensing in a lower-power mode by operating only some pixels of the image sensor. In this regard, the electronic device may independently use the power of the image sensor when performing the operation of a camera and may perform power switching of the camera.

The electronic device may correct a signal when performing proximity/illuminance sensing by utilizing an iris sensor/front camera. For example, the electronic device may measure the quantity of surrounding light by turning on the illuminance sensor after being powered on. The electronic device simultaneously may turn on an IR LED and an iris IR LED included in a proximity sensor or disposed adjacent to the proximity sensor in a call scenario (in receiving a signal for call connection). Then, if a distance from an object is less than a specified distance (e.g., 5 cm), the electronic device may turn off the iris IR LED and may perform proximity recognition only by using the IR LED in the proximity sensor. If the distance from the object is equal to or more than the specified distance (e.g., 5 cm), the electronic device may turn on the iris IR LED and may turn off the IR LED for the proximity sensor, thereby determining the proximity of the object.

According to various embodiments, if a call connection scenario is absent (e.g., a call does not occur), the electronic device may perform a proximity operation based on pixels used for measuring illuminance and included in the image sensor. If the surrounding illuminance is less than a specified value (a low-illuminance environment), the electronic device applies power to pixels for illuminance sensing of a front camera to perform an illuminance correction function. When the electronic device enters into a camera mode, the electronic device may apply power to entire pixels of the image sensor to perform image capturing by a camera through power switching of the image sensor.

According to various embodiments, a method of operating an electronic device may include receiving a request for execution of an application, activating an illuminance sensor corresponding to the request for the execution of the application, measuring illuminance by using an iris camera having an infrared pass filter disposed on an image sensor of the iris camera, if an illuminance value measured by the illuminance sensor is less than a first illuminance value and acquiring an image by turning on entire pixels of the image sensor when the image is captured by using the iris camera, if an illuminance value sensed based on the iris camera is less than a specified value.

As described above, various embodiments may more safely protect the information in the electronic devices and may readily support executing specified user functions of the electronic devices.

Figure 10:
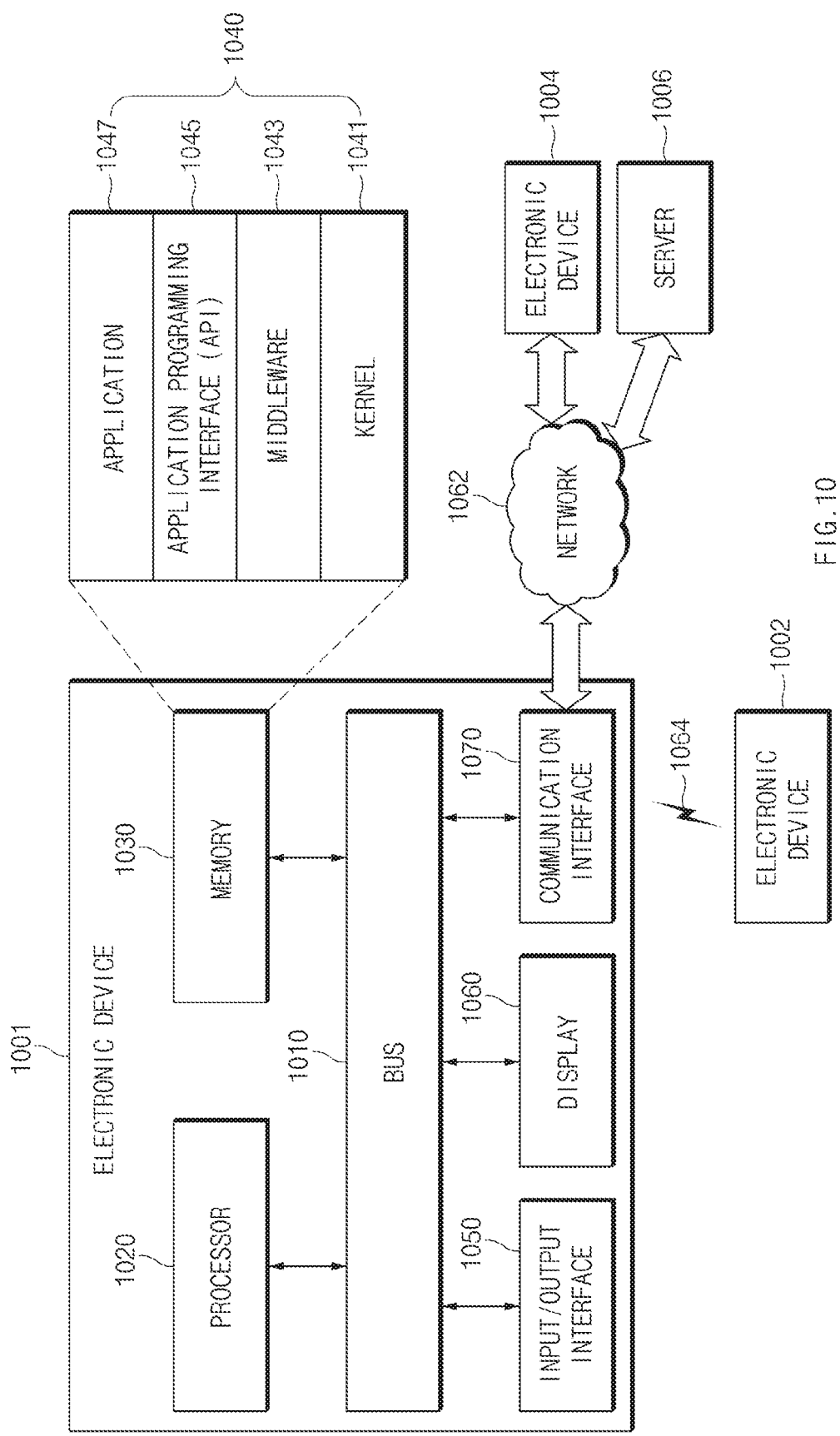
FIG. 10 is a block diagram illustrating a configuration of an electronic device in a network environment according to an embodiment.

FIG. 10 is a block diagram illustrating a configuration of an electronic device in a network environment according to an embodiment.

Referring to FIG. 10, in various embodiments, an electronic device 1001 and a first external electronic device 1002, a second external electronic device 1004, or a server 1006 may connect with each other through a network 1062 or local-area communication 1064. The electronic device 1001 may include a bus 1010, a processor 1020, a memory 1030, an input and output interface 1050, a display 1060, and a communication interface 1070. In various embodiments, at least one of the components may be omitted from the electronic device 1001, or other components may be additionally included in the electronic device 1001.

The bus 1010 may be, for example, a circuit which connects the components 1020 to 1070 with each other and transmits a communication signal (e.g., a control message and/or data) between the components.

The processor 1020 may include one or more of a central processing unit (CPU), an application processor (AP), or a communication processor (CP). For example, the processor 1020 may perform calculation or data processing about control and/or communication of at least another of the components of the electronic device 1001.

The memory 1030 may include a volatile and/or non-volatile memory. The memory 1030 may store, for example, a command or data associated with at least another of the components of the electronic device 1001. According to an embodiment, the memory 1030 may store software and/or a program 1040. The program 1040 may include, for example, a kernel 1041, a middleware 1043, an application programming interface (API) 1045, and/or an least one application program 1047 (or "at least one application"), and the like. At least part of the kernel 1041, the middleware 1043, or the API 1045 may be referred to as an operating system (OS).

The kernel 1041 may control or manage, for example, system resources (e.g., the bus 1010, the processor 1020, or the memory 1030, and the like) used to execute an operation or function implemented in the other programs (e.g., the middleware 1043, the API 1045, or the application program 1047). Also, as the middleware 1043, the API 1045, or the application program 1047 accesses a separate component of the electronic device 1001, the kernel 1041 may provide an interface which may control or manage system resources.

The middleware 1043 may play a role as, for example, a go-between such that the API 1045 or the application program 1047 communicates with the kernel 1041 to communicate data.

Also, the middleware 1043 may process one or more work requests, received from the application program 1047, in order of priority. For example, the middleware 1043 may assign priority which may use system resources (the bus 1010, the processor 1020, or the memory 1030, and the like) of the electronic device 1001 to at least one of the at least one application program 1047. For example, the middleware 1043 may perform scheduling or load balancing for the one or more work requests by processing the one or more work requests in order of the priority assigned to the at least one of the at least one application program 1047.

The API 1045 may be, for example, an interface in which the application program 1047 controls a function provided from the kernel 1041 or the middleware 1043. For example, the API 1045 may include at least one interface or function (e.g., a command) for file control, window control, image processing, or text control, and the like.

The input and output interface 1050 may play a role as, for example, an interface which may transmit a command or data input from a user or another external device to another component (or other components) of the electronic device 1001. Also, input and output interface 1050 may output an instruction or data received from another component (or other components) of the electronic device 1001 to the user or the other external device.

The display 1060 may include, for example, a liquid crystal display (LCD), a light emitting diode (LED) display, an organic LED (OLED) display, a microelectromechanical systems (MEMS) display, or an electronic paper display. The display 1060 may display, for example, a variety of content (e.g., text, images, videos, icons, or symbols, and the like) to the user. The display 1060 may include a touch screen, and may receive, for example, touch, gesture, proximity, or a hovering input using an electronic pen or part of a body of the user.

The communication interface 1070 may establish communication between, for example, the electronic device 1001 and an external device (e.g., a first external electronic device 1002, a second external electronic device 1004, or a server 1006). For example, the communication interface 1070 may connect to a network 1062 through wireless communication or wired communication and may communicate with the external device (e.g., the second external electronic device 1004 or the server 1006).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 1064. The local-area communication 1064 may include, for example, at least one of wireless-fidelity (Wi-Fi) communication, Bluetooth (BT) communication, near field communication (NFC), or global navigation satellite system (GNSS) communication, and the like.

An MST module may generate a pulse based on transmission data using an electromagnetic signal and may generate a magnetic field signal based on the pulse. The electronic device 1001 may output the magnetic field signal to a point of sales (POS) system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 1062 may include a telecommunications network, for example, at least one of a computer network (e.g., a local area network (LAN) or a wide area network (WAN)), the Internet, or a telephone network.

Each of the first and second external electronic devices 1002 and 1004, respectively may be the same as or different device from the electronic device 1001. According to an embodiment, the server 1006 may include a group of one or more servers. According to various embodiments, all or some of operations executed in the electronic device 1001 may be executed in another electronic device or a plurality of electronic devices (e.g., the first external electronic device 1002, the second external electronic device 1004, or the server 1006). According to an embodiment, if the electronic device 1001 should perform any function or service automatically or according to a request, it may request another device (e.g., the first external electronic device 1002, the second external electronic device 1004, or the server 1006) to perform at least part of the function or service, rather than executing the function or service for itself or in addition to the function or service. The other electronic device (e.g., the first external electronic device 1002, the second external electronic device 1004, or the server 1006) may execute the requested function or the added function and may transmit the executed result to the electronic device 1001. The electronic device 1001 may process the received result without change or additionally and may provide the requested function or service. For this purpose, for example, cloud computing technologies, distributed computing technologies, or client-server computing technologies may be used.

Figure 11:
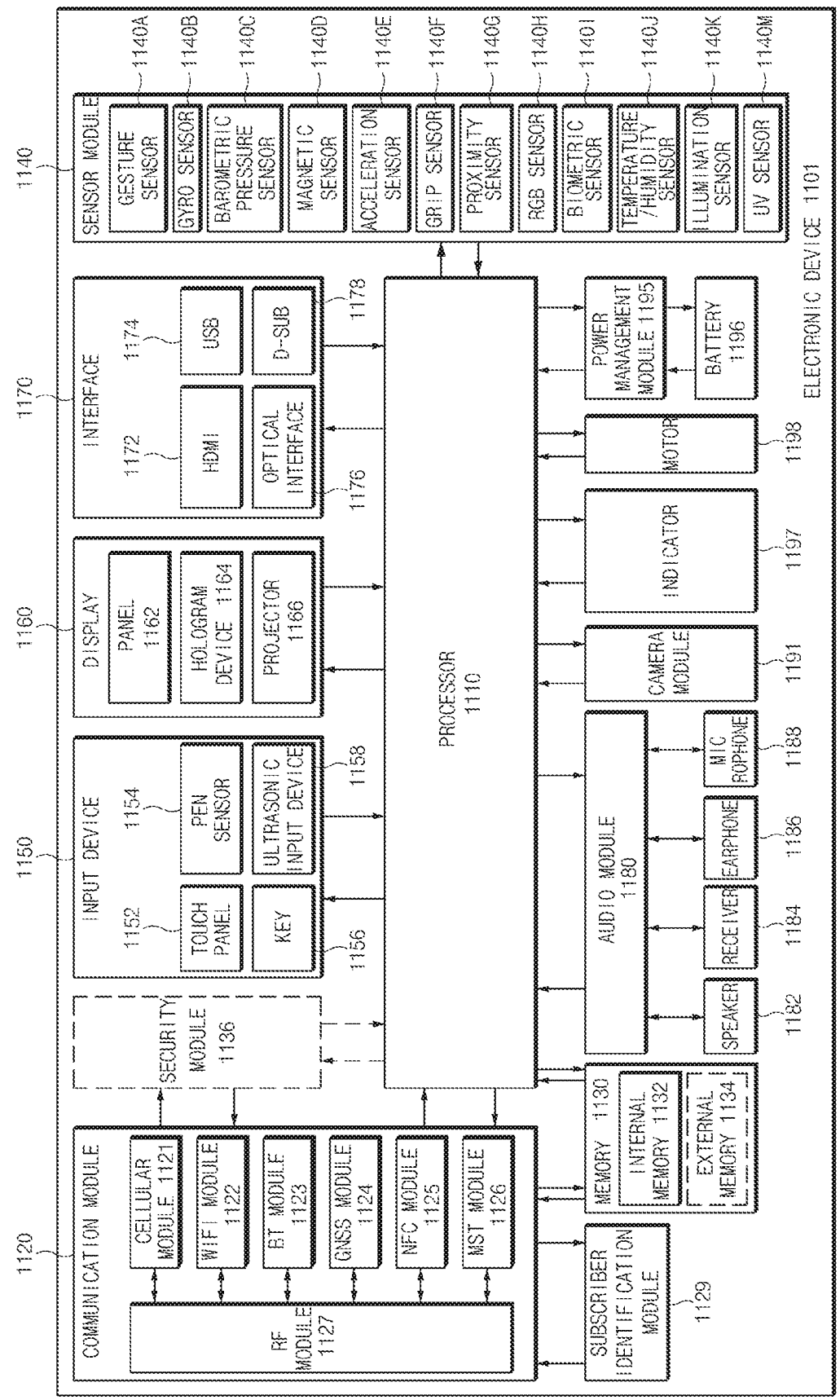
FIG. 11 is a block diagram illustrating a configuration of an electronic device according to various embodiments.

FIG. 11 is a block diagram illustrating a configuration of an electronic device according to various embodiments.

Referring to FIG. 11, the electronic device 1101 may include, for example, all or part of an electronic device 1001 shown in FIG. 10. The electronic device 1101 may include one or more processors 1110 (e.g., application processors (APs)), a communication module 1120, a subscriber identification module (SIM) 1129, a memory 1130, a security module 1136, a sensor module 1140, an input device 1150, a display 1160, an interface 1170, an audio module 1180, a camera module 1191, a power management module 1195, a battery 1196, an indicator 1197, and a motor 1198.

The processor 1110 may drive, for example, an operating system (OS) or an application program to control a plurality of hardware or software components connected thereto and may process and compute a variety of data. The processor 1110 may be implemented with, for example, a system on chip (SoC). According to an embodiment, the processor 1110 may include a graphic processing unit (GPU) (not shown) and/or an image signal processor (not shown). The processor 1110 may include at least some (e.g., a cellular module 1121) of the components shown in FIG. 11. The processor 1110 may load a command or data received from at least one of other components (e.g., a non-volatile memory) into a volatile memory to process the data and may store various data in a non-volatile memory.

The communication module 1120 may have the same or similar configuration to a communication interface 1070 of FIG. 10. The communication module 1120 may include, for example, the cellular module 1121, a wireless-fidelity (Wi-Fi) module 1122, a Bluetooth (BT) module 1123, a global navigation satellite system (GNSS) module 1124 (e.g., a GPS module, a Glonass module, a Beidou module, or a Galileo module), a near field communication (NFC) module 1125, an MST module 1126, and a radio frequency (RF) module 1127.

The cellular module 1121 may provide, for example, a voice call service, a video call service, a text message service, or an Internet service, and the like through a communication network. According to an embodiment, the cellular module 1121 may identify and authenticate the electronic device 1101 in a communication network using the SIM 1129 (e.g., a SIM card). According to an embodiment, the cellular module 1121 may perform at least part of functions which may be provided by the processor 1110. According to an embodiment, the cellular module 1121 may include a communication processor (CP).

The Wi-Fi module 1122, the BT module 1123, the GNSS module 1124, the NFC module 1125, or the MST module 1126 may include, for example, a processor for processing data transmitted and received through the corresponding module. According to various embodiments, at least some (e.g., two or more) of the cellular module 1121, the Wi-Fi module 1122, the BT module 1123, the GNSS module 1124, the NFC module 1125, or the MST module 1126 may be included in one integrated chip (IC) or one IC package.

The RF module 1127 may transmit and receive, for example, a communication signal (e.g., an RF signal). Though not shown, the RF module 1127 may include, for example, a transceiver, a power amplifier module (PAM), a frequency filter, or a low noise amplifier (LNA), or an antenna, and the like. According to another embodiment, at least one of the cellular module 1121, the Wi-Fi module 1122, the BT module 1123, the GNSS module 1124, the NFC module 1125, or the MST module 1126 may transmit and receive an RF signal through a separate RF module.

The SIM 1129 may include, for example, a card which includes a SIM and/or an embedded SIM. The SIM 1129 may include unique identification information (e.g., an integrated circuit card identifier (ICCID)) or subscriber information (e.g., an international mobile subscriber identity (IMSI)).

The memory 1130 (e.g., a memory 1030 of FIG. 10) may include, for example, an embedded internal memory 1132 or an external memory 1134. The embedded internal memory 1132 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1134 may include a flash drive, for example, a compact flash (CF), a secure digital (SD), a micro-SD, a mini-SD, an extreme digital (xD), a multimedia car (MMC), or a memory stick, and the like. The external memory 1134 may operatively and/or physically connect with the electronic device 1101 through various interfaces.

The secure module 1136 may be a module which has a relatively higher secure level than the memory 1130 and may be a circuit which stores secure data and guarantees a protected execution environment. The secure module 1136 may be implemented with a separate circuit and may include a separate processor. The secure module 1136 may include, for example, an embedded secure element (eSE) which is present in a removable smart chip or a removable SD card or is embedded in a fixed chip of the electronic device 1101. Also, the secure module 1136 may be driven by an OS different from the OS of the electronic device 1101. For example, the secure module 1136 may operate based on a java card open platform (JCOP) OS.

The sensor module 1140 may measure, for example, a physical quantity or may detect an operation state of the electronic device 1101, and may convert the measured or detected information to an electric signal. The sensor module 1140 may include at least one of, for example, a gesture sensor 1140A, a gyro sensor 1140B, a barometer sensor 1140C, a magnetic sensor 1140D, an acceleration sensor 1140E, a grip sensor 1140F, a proximity sensor 1140G, a color sensor 1140H (e.g., red, green, blue (RGB) sensor), a biometric sensor 1140I, a temperature/humidity sensor 1140J, an illumination sensor 1140K, or an ultraviolet (UV) sensor 1140M. Additionally or alternatively, the sensor module 1140 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1140 may further include a control circuit for controlling at least one or more sensors included therein.

According to various embodiments, the electronic device 1101 may further include a processor configured to control the sensor module 1140, as part of the processor 1110 or to be independent of the processor 1110. While the processor 1110 is in a sleep state, the electronic device 1101 may control the sensor module 1140.

The input device 1150 may include, for example, a touch panel 1152, a (digital) pen sensor 1154, a key 1156, or an ultrasonic input device 1158. The touch panel 1152 may use at least one of, for example, a capacitive type, a resistive type, an infrared type, or an ultrasonic type. Also, the touch panel 1152 may further include a control circuit. The touch panel 1152 may further include a tactile layer and may provide a tactile reaction to a user.

The (digital) pen sensor 1154 may be, for example, part of the touch panel 1152 or may include a separate sheet for recognition. The key 1156 may include, for example, a physical button, an optical key, or a keypad. The ultrasonic input device 1158 may allow the electronic device 1101 to detect a sound wave using a microphone (e.g., a microphone 1188) and to verify data through an input tool generating an ultrasonic signal.

The display 1160 (e.g., a display 1060 of FIG. 10) may include a panel 1162, a hologram device 1164, or a projector 1166. The panel 1162 may include the same or similar configuration to the display 160 or 1060. The panel 1162 may be implemented to be, for example, flexible, transparent, or wearable. The panel 1162 and the touch panel 1152 may be integrated into one module. The hologram device 1164 may show a stereoscopic image in a space using interference of light. The projector 1166 may project light onto a screen to display an image. The screen may be positioned, for example, inside or outside the electronic device 1101. According to an embodiment, the display 1160 may further include a control circuit for controlling the panel 1162, the hologram device 1164, or the projector 1166.

The interface 1170 may include, for example, a high-definition multimedia interface (HDMI) 1172, a universal serial bus (USB) 1174, an optical interface 1176, or a D-subminiature 1178. The interface 1170 may be included in, for example, a communication interface 1070 shown in FIG. 10. Additionally or alternatively, the interface 1170 may include, for example, a mobile high definition link (MHL) interface, an SD card/multimedia card (MMC) interface, or an infrared data association (IrDA) standard interface.

The audio module 1180 may convert a sound and an electric signal in dual directions. At least part of components of the audio module 1180 may be included in, for example, an input and output interface 1050 (or a user interface) shown in FIG. 10. The audio module 1180 may process sound information input or output through, for example, a speaker 1182, a receiver 1184, an earphone 1186, or the microphone 1188, and the like.

The camera module 1191 may be a device which captures a still image and a moving image. According to an embodiment, the camera module 1191 may include one or more image sensors (not shown) (e.g., a front sensor or a rear sensor), a lens (not shown), an image signal processor (ISP) (not shown), or a flash (not shown) (e.g., an LED or a xenon lamp).

The power management module 1195 may manage, for example, power of the electronic device 1101. According to an embodiment, though not shown, the power management module 1195 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1196 and voltage, current, or temperature thereof while the battery 1196 is charged. The battery 1196 may include, for example, a rechargeable battery or a solar battery.

The indicator 1197 may display a specific state of the electronic device 1101 or part (e.g., the processor 1110) thereof, for example, a booting state, a message state, or a charging state, and the like. The motor 1198 may convert an electric signal into mechanical vibration and may generate vibration or a haptic effect, and the like. Though not shown, the electronic device 1101 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a MediaFlo® standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 12:
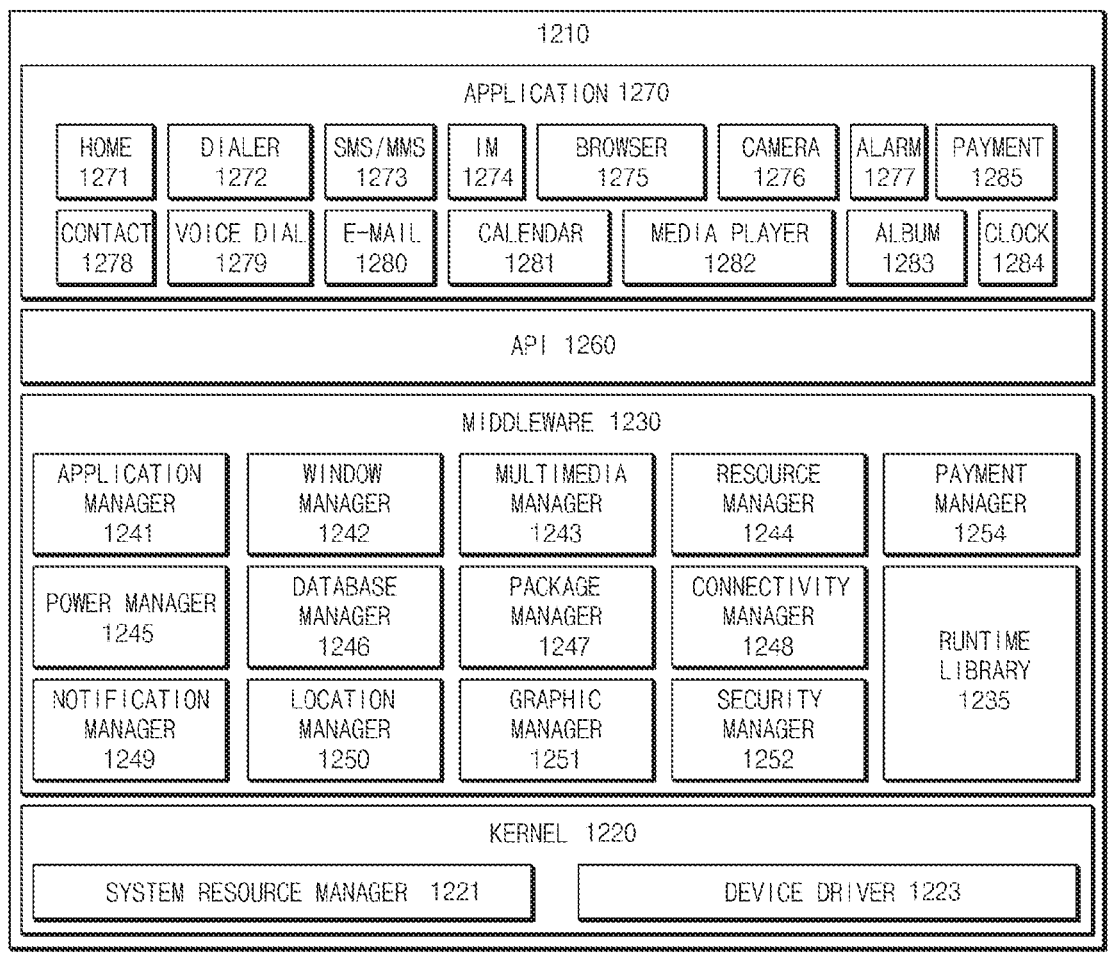
FIG. 12 is a block diagram illustrating a configuration of a program module according to various embodiments.

FIG. 12 is a block diagram illustrating a configuration of a program module according to various embodiments.

According to an embodiment, the program module 1210 (e.g., a program 1040 of FIG. 10) may include an operating system (OS) for controlling resources associated with an electronic device (e.g., an electronic device 1001 of FIG. 10) and/or various applications (e.g., an application program 1047 of FIG. 10) which are executed on the OS. The OS may be, for example, Android, iOS, Windows, Symbian, Tizen, or Bada, and the like.

The program module 1210 may include a kernel 1220, a middleware 1230, an application programming interface (API) 1260, and/or an application 1270. At least part of the program module 1210 may be preloaded on the electronic device, or may be downloaded from an external electronic device (e.g., a first external electronic device 1002, a second external electronic device 1004, or a server 1006, and the like of FIG. 10).

The kernel 1220 (e.g., a kernel 1041 of FIG. 10) may include, for example, a system resource manager 1221 and/or a device driver 1223. The system resource manager 1221 may control, assign, or collect, and the like system resources. According to an embodiment, the system resource manager 1221 may include a process management unit, a memory management unit, or a file system management unit, and the like. The device driver 1223 may include, for example, a display driver, a camera driver, a Bluetooth (BT) driver, a shared memory driver, a universal serial bus (USB)

driver, a keypad driver, a wireless-fidelity (Wi-Fi) driver, an audio driver, or an inter-process communication (IPC) driver.

The middleware 1230 (e.g., a middleware 1043 of FIG. 10) may provide, for example, functions the application 1270 needs in common, and may provide various functions to the application 1270 through the API 1260 such that the application 1270 efficiently uses limited system resources in the electronic device. According to an embodiment, the middleware 1230 (e.g., the middleware 1043) may include at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, a security manager 1252, or a payment manager 1254.

The runtime library 1235 may include, for example, a library module used by a compiler to add a new function through a programming language while the application 1270 is executed. The runtime library 1235 may perform a function about input and output management, memory management, or an arithmetic function.

The application manager 1241 may manage, for example, a life cycle of at least one of the application 1270. The window manager 1242 may manage graphic user interface (GUI) resources used on a screen of the electronic device. The multimedia manager 1243 may determine a format utilized for reproducing various media files and may encode or decode a media file using a codec corresponding to the corresponding format. The resource manager 1244 may manage source codes of at least one of the application 1270, and may manage resources of a memory or a storage space, and the like.

The power manager 1245 may act together with, for example, a basic input/output system (BIOS) and the like, may manage a battery or a power source, and may provide power information utilized for an operation of the electronic device. The database manager 1246 may generate, search, or change a database to be used in at least one of the application 1270. The package manager 1247 may manage installation or update of an application distributed by a type of a package file.

The connectivity manager 1248 may manage, for example, wireless connection such as Wi-Fi connection or BT connection, and the like. The notification manager 1249 may display or notify events, such as an arrival message, an appointment, and proximity notification, by a method which is not disturbed to the user. The location manager 1250 may manage location information of the electronic device. The graphic manager 1251 may manage a graphic effect to be provided to the user or a user interface (UI) related to the graphic effect. The security manager 1252 may provide all security functions utilized for system security or user authentication, and the like. According to an embodiment, when the electronic device (e.g., an electronic device 100 or 1001 of FIG. 1 or 10) has a phone function, the middleware 1230 may further include a telephony manager (not shown) for managing a voice or video communication function of the electronic device.

The middleware 1230 may include a middleware module which configures combinations of various functions of the above-described components. The middleware 1230 may provide a module which specializes according to kinds of OSs to provide a differentiated function. Also, the middleware 1230 may dynamically delete some of old components or may add new components.

The API 1260 (e.g., an API 1045 of FIG. 10) may be, for example, a set of API programming functions, and may be provided with different components according to OSs. For example, in case of Android or iOS, one API set may be provided according to platforms. In case of Tizen, two or more API sets may be provided according to platforms.

The application 1270 (e.g., an application program 1047 of FIG. 10) may include one or more of, for example, a home application 1271, a dialer application 1272, a short message service/multimedia message service (SMS/MMS) application 1273, an instant message (IM) application 1274, a browser application 1275, a camera application 1276, an alarm application 1277, a contact application 1278, a voice dial application 1279, an e-mail application 1280, a calendar application 1281, a media player application 1282, an album application 1283, a clock application 1284, a health care application (e.g., an application for measuring quantity of exercise or blood sugar, and the like), or an environment information application (e.g., an application for providing atmospheric pressure information, humidity information, or temperature information, and the like), and the like.

According to an embodiment, the application 1270 may include an application (hereinafter, for better understanding and ease of description, referred to as "information exchange application") for exchanging information between the electronic device (e.g., the electronic device 1001 of FIG. 10) and an external electronic device (e.g., the first external electronic device 1002 or the second external electronic device 1004). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 1002 or the second external electronic device 1004). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 1002 or the second external electronic device 1004) which communicates with the electronic device, an application which operates in the external electronic device, or a service (e.g., a call service or a message service) provided from the external electronic device.

According to an embodiment, the application 1270 may include an application (e.g., the health card application of a mobile medical device) which is preset according to attributes of the external electronic device (e.g., the first external electronic device 1002 or the second external electronic device 1004). According to an embodiment, the application 1270 may include an application received from the external electronic device (e.g., the server 1006, the first external electronic device 1002, or the second external electronic device 1004). According to an embodiment, the application 1270 may include a preloaded application or a third party application which may be downloaded from a server. Names of the components of the program module 1210 according to various embodiments of the present disclosure may differ according to kinds of OSs.

According to various embodiments, at least part of the program module 1210 may be implemented with software, firmware, hardware, or at least two or more combinations thereof. At least part of the program module 1210 may be implemented (e.g., executed) by, for example, a processor (e.g., a processor 1020 of FIG. 10). At least part of the program module 1210 may include, for example, a module, a program, a routine, sets of instructions, or a process, and the like for performing one or more functions.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
    a housing including a first surface that is open in a first direction and a second surface that is disposed in a second direction;
    a display including a window disposed on the first surface that is open;
    a light emitting module disposed under the window configured to radiate light related to an iris sensing function;
    a camera, which includes a plurality of pixels, disposed under the window and spaced apart from the light emitting module by a specific distance;
    a mode change switch; and
    a processor electrically connected with the light emitting module and the camera,
    wherein the processor is configured to:
        selectively perform at least one of the iris sensing function, a proximity sensing function or a super proximity sensing function based on the camera according to a type of an application that is requested to be executed,
adjust an amount of the plurality of pixels to turn-on differentially according to performing one of the iris sensing function, the proximity sensing function or the super proximity sensing function, based on the mode change switch, and
wherein the iris sensing function, the proximity sensing function, and the super proximity sensing function, indicate certain pixels of the camera to initiate for image capturing.

2. The electronic device of claim 1, wherein the processor is configured to:
increase an intensity of light radiated from the light emitting module in a first state for performing the iris sensing function than in a second state for performing the proximity sensing function.

3. The electronic device of claim 1, wherein the processor is configured to:
increase an intensity of light radiated from the light emitting module in a first state for performing the proximity sensing function than in a second state for performing the super proximity sensing function.

4. The electronic device of claim 1, wherein the processor is configured to:
process the iris sensing function by using entire pixels included in an image sensor.

5. The electronic device of claim 1, wherein the processor is configured to:
process the proximity sensing function by using pixels that occupy a specific ratio of pixels from entire pixels included in an image sensor.

6. The electronic device of claim 5, wherein the processor is configured to:
process the super proximity sensing function by using fewer pixels than the specific ratio of pixels used for the proximity sensing function.

7. The electronic device of claim 1, wherein the processor is configured to:
divide an image sensor, of the camera, into a plurality of areas; and
process the iris sensing function by using pixels included in all of the plurality of areas of the image sensor.

8. The electronic device of claim 7, wherein the processor is configured to:
process the proximity sensing function by using pixels included in some areas of the plurality of areas.

9. The electronic device of claim 8, wherein the processor is configured to:
process the super proximity sensing function by using pixels in an area that is narrower than the areas used for the proximity sensing function.

10. The electronic device of claim 1, wherein the camera includes:
an image sensor;
a first filter selectively disposed on the image sensor to pass a visible light;
a second filter selectively disposed on the image sensor to pass an infrared light; and
a switching driving unit configured to switch a location of the first filter or a location of the second filter.

11. The electronic device of claim 10, wherein the processor is configured to:
dispose the second filter on the image sensor when performing the iris sensing function, the proximity sensing function, or the super proximity sensing function.

12. The electronic device of claim 1, wherein the light emitting module and the camera are disposed in a non-display area of the display.

13. An electronic device comprising:
a housing including a first surface that is open in a first direction and a second surface that is disposed in a second direction;
a display including a window disposed on the first surface that is open;
a light emitting module disposed under the window configured to radiate light related to iris sensing;
a camera disposed under the window and spaced apart from the light emitting module by a specific distance;
a proximity sensor disposed under the window; and
a processor electrically connected with the proximity sensor, the light emitting module, and the camera,
wherein the processor is configured to:
perform at least one of an iris sensing function based on the camera, a super proximity sensing function based on the camera, or a proximity sensing function based on the proximity sensor, according to a type of an application that is requested to be executed,
adjust an amount of a plurality of pixels to turn-on differentially according to performing one of the iris sensing function, the proximity sensing function or the super proximity sensing function, based on a mode change switch, and
wherein the iris sensing function, the proximity sensing function, and the super proximity sensing function, indicate certain pixels of the camera to initiate for image capturing.

14. The electronic device of claim 13, wherein the processor is configured to:
perform the proximity sensing function by using the camera if the application to be executed is a call function.

15. The electronic device of claim 14, wherein the processor is configured to:
perform the proximity sensing function by using some pixels among entire pixels included in an image sensor of the camera.

16. The electronic device of claim 13, wherein the processor is configured to:
perform the proximity sensing function by activating the proximity sensor if an object sensed by using the camera has proximity within a specified first distance.

17. The electronic device of claim 16, wherein the processor is configured to:
activate the camera as the proximity sensor is activated.

* * * * *